US012563109B2

(12) United States Patent
Tassone et al.

(10) Patent No.: US 12,563,109 B2
(45) Date of Patent: *Feb. 24, 2026

(54) COMPUTER-PROGRAMMED TELEPHONE-ENABLED DEVICES FOR PROCESSING AND MANAGING NUMEROUS SIMULTANEOUS VOICE CONVERSATIONS CONDUCTED BY AN INDIVIDUAL OVER A COMPUTER NETWORK AND COMPUTER METHODS OF IMPLEMENTING THEREOF

(71) Applicant: VOXSMART LIMITED, London (GB)

(72) Inventors: Anthony Tassone, Saint Charles, IL (US); Eric Detterman, Birmingham, MI (US)

(73) Assignee: VOXSMART LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,862

(22) Filed: Sep. 28, 2023

(65) Prior Publication Data

US 2024/0031490 A1     Jan. 25, 2024

Related U.S. Application Data

(63) Continuation of application No. 18/060,307, filed on Nov. 30, 2022, now Pat. No. 11,811,973, which is a
(Continued)

(51) Int. Cl.
*H04M 7/10*          (2006.01)
*G06F 3/0481*        (2022.01)
(Continued)

(52) U.S. Cl.
CPC ........ *H04L 65/1083* (2013.01); *G06F 3/0481* (2013.01); *G06F 3/0484* (2013.01);
(Continued)

(58) Field of Classification Search
None
See application file for complete search history.

(56) References Cited

U.S. PATENT DOCUMENTS 7,133,513 B1     11/2006  Zhang
7,236,580 B1 *    6/2007  Sarkar ............... H04M 3/42221
                                                    704/235
(Continued)

FOREIGN PATENT DOCUMENTS

WO     WO 2011/014531          2/2011

*Primary Examiner* — Duc T Duong
(74) *Attorney, Agent, or Firm* — PIERSON FERDINAND LLP; Keats Quinalty

(57)          ABSTRACT

In some embodiments, the present invention provides for a computer-implemented method, including: causing, by a specifically programmed computer call management communication system, to transform, over a computer network, computing devices of users, into corresponding specialized call management devices, by having each computing device to execute a specialized call management client software application being in electronic communication with the specifically programmed computer call management communication system over the computer network by utilizing SIP; where the specialized call management client software application generates specialized graphical user interfaces configured to allow each user to concurrently initiate and maintain, over the computer network, a plurality of voice communications of distinct types with other users, by, for example, allowing each user to independently and dynamically divert, in real-time, any voice communication of any type to any audio device associated with a corresponding specialized call management device of such user.

15 Claims, 36 Drawing Sheets

Related U.S. Application Data continuation of application No. 17/089,943, filed on Nov. 5, 2020, now Pat. No. 11,546,474, which is a continuation of application No. 16/150,128, filed on Oct. 2, 2018, now Pat. No. 10,893,149, which is a continuation of application No. 15/842,520, filed on Dec. 14, 2017, now abandoned, which is a continuation of application No. 14/926,342, filed on Oct. 29, 2015, now abandoned, which is a continuation of application No. 14/687,597, filed on Apr. 15, 2015, now Pat. No. 9,178,773.

(60) Provisional application No. 62/022,859, filed on Jul. 10, 2014, provisional application No. 61/979,807, filed on Apr. 15, 2014.

(51) Int. Cl.

| | |
|---|---|
| *G06F 3/0484* | (2022.01) |
| *G06F 3/04842* | (2022.01) |
| *G06F 3/04847* | (2022.01) |
| *H04L 41/22* | (2022.01) |
| *H04L 65/1083* | (2022.01) |
| *H04L 65/1093* | (2022.01) |
| *H04L 65/1096* | (2022.01) |
| *H04L 65/1104* | (2022.01) |
| *H04L 65/403* | (2022.01) |
| *H04M 7/00* | (2006.01) |
| *H04M 9/00* | (2006.01) |
| *H04W 4/16* | (2009.01) |
| *H04M 3/42* | (2006.01) |
| *H04W 4/08* | (2009.01) |
| *H04W 92/18* | (2009.01) |

(52) U.S. Cl.
CPC ...... *G06F 3/04842* (2013.01); *G06F 3/04847* (2013.01); *H04L 41/22* (2013.01); *H04L 65/1093* (2013.01); *H04L 65/1096* (2013.01); *H04L 65/1104* (2022.05); *H04L 65/403* (2013.01); *H04M 7/0012* (2013.01); *H04M 7/0024* (2013.01); *H04M 9/00* (2013.01); *H04M 9/003* (2013.01); *H04W 4/16* (2013.01); *H04M 3/42221* (2013.01); *H04M 7/0084* (2013.01); *H04W 4/08* (2013.01); *H04W 92/18* (2013.01)

(56) References Cited

U.S. PATENT DOCUMENTS

| | | | |
|---|---|---|---|
| 7,606,909 B1 | 10/2009 | Ely et al. | |
| 7,761,515 B2 | 7/2010 | Denninghoff | |
| 7,912,020 B2 | 3/2011 | Khasawneh et al. | |
| 8,103,873 B2 | 1/2012 | Claudatos et al. | |
| 8,442,197 B1 * | 5/2013 | Mazza | H04M 3/56 |
| | | | 379/915 |
| 8,576,750 B1 * | 11/2013 | Hecht | H04L 12/1818 |
| | | | 379/202.01 |
| 9,037,977 B1 | 5/2015 | Tovino et al. | |
| 9,779,760 B1 | 10/2017 | Ouimette et al. | |
| 10,069,873 B2 | 9/2018 | Cozzi et al. | |
| 10,320,987 B2 | 6/2019 | Forstall et al. | |
| 11,089,134 B1 | 8/2021 | Gordon et al. | |
| 2004/0223464 A1 | 11/2004 | Dye et al. | |
| 2005/0073964 A1 | 4/2005 | Schmidt et al. | |
| 2005/0248652 A1 | 11/2005 | Firestone et al. | |
| 2006/0126806 A1 | 6/2006 | Trandal et al. | |
| 2007/0111743 A1 | 5/2007 | Leigh et al. | |
| 2007/0206760 A1 * | 9/2007 | Bandhole | H04M 3/42382 |
| | | | 379/202.01 |
| 2007/0258456 A1 | 11/2007 | Khouderchah et al. | |
| 2008/0200159 A1 | 8/2008 | Lai | |
| 2009/0016507 A1 | 1/2009 | Altberg et al. | |
| 2009/0022145 A1 | 1/2009 | Bakshi et al. | |
| 2009/0080635 A1 | 3/2009 | Altberg et al. | |
| 2009/0119100 A1 | 5/2009 | Akella et al. | |
| 2009/0161851 A1 | 6/2009 | Brooks et al. | |
| 2009/0232295 A1 | 9/2009 | Ryskamp | |
| 2009/0304168 A1 | 12/2009 | Bakshi et al. | |
| 2010/0061539 A1 * | 3/2010 | Cloran | G06Q 30/02 |
| | | | 379/202.01 |
| 2010/0110004 A1 | 5/2010 | Minutillo et al. | |
| 2010/0131866 A1 * | 5/2010 | Nielsen | H04L 12/1822 |
| | | | 715/835 |
| 2011/0112833 A1 | 5/2011 | Frankel et al. | |
| 2011/0195739 A1 * | 8/2011 | Deleus | H04W 76/45 |
| | | | 704/235 |
| 2011/0255446 A1 | 10/2011 | Potts et al. | |
| 2011/0268262 A1 * | 11/2011 | Jones | H04M 3/42008 |
| | | | 379/202.01 |
| 2011/0271208 A1 | 11/2011 | Jones et al. | |
| 2012/0033661 A1 | 2/2012 | Knappe | |
| 2012/0059651 A1 * | 3/2012 | Delgado | H04W 4/80 |
| | | | 704/E15.044 |
| 2012/0128146 A1 * | 5/2012 | Boss | H04M 3/564 |
| | | | 379/202.01 |
| 2012/0131089 A1 | 5/2012 | Berkowitz et al. | |
| 2012/0170726 A1 * | 7/2012 | Schwartz | H04M 3/56 |
| | | | 379/93.02 |
| 2012/0239822 A1 * | 9/2012 | Poulson | H04L 41/0654 |
| | | | 709/239 |
| 2012/0321062 A1 * | 12/2012 | Fitzsimmons | H04L 65/4015 |
| | | | 379/202.01 |
| 2013/0013804 A1 | 1/2013 | Traynor | |
| 2014/0063175 A1 | 3/2014 | Jafry et al. | |
| 2014/0149919 A1 | 5/2014 | Larson et al. | |
| 2014/0241340 A1 | 8/2014 | Seligmann et al. | |
| 2014/0273974 A1 | 9/2014 | Varghese et al. | |
| 2014/0280991 A1 * | 9/2014 | Lederman | H04L 67/306 |
| | | | 709/228 |
| 2014/0328479 A1 | 11/2014 | Epiktetov | |
| 2014/0333713 A1 | 11/2014 | Shoemake et al. | |
| 2014/0335837 A1 | 11/2014 | Zhu | |
| 2014/0362979 A1 * | 12/2014 | Kaplan | H04M 3/568 |
| | | | 379/67.1 |
| 2015/0049867 A1 | 2/2015 | Jafry et al. | |
| 2015/0119080 A1 | 4/2015 | Husain et al. | |
| 2015/0156324 A1 | 6/2015 | Assem et al. | |
| 2015/0188956 A1 | 7/2015 | Chauhan et al. | |
| 2016/0150089 A1 | 5/2016 | Garg | |
| 2022/0286310 A1 * | 9/2022 | Rathnam | G06F 3/0482 |

* cited by examiner

Figure 23A:
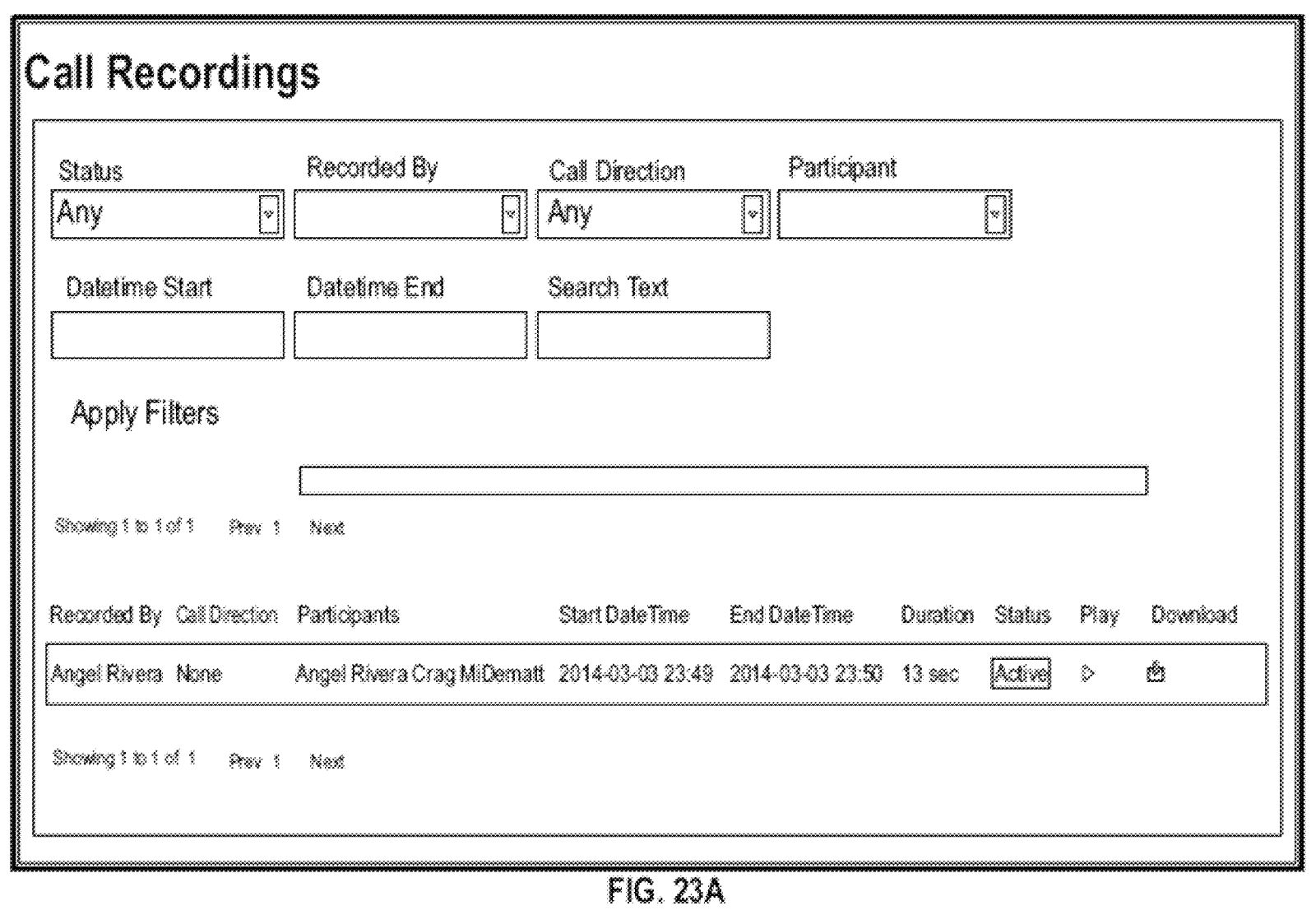

Call Recordings

| Status | Recorded By | Call Direction | Participant |
|---|---|---|---|
| Any | | Any | |

| Datetime Start | Datetime End | Search Text |
|---|---|---|

Apply Filters

Showing 1 to 1 of 1    Prev    1    Next

| Recorded By | Call Direction | Participants | Start Date Time | End Date Time | Duration | Status | Play | Download |
|---|---|---|---|---|---|---|---|---|
| Angel Rivera | None | Angel Rivera Craig McDermott | 2014-03-03 23:49 | 2014-03-03 23:50 | 13 sec | Active | ▷ | ⬇ |

Showing 1 to 1 of 1    Prev    1    Next

COMPUTER-PROGRAMMED TELEPHONE-ENABLED DEVICES FOR PROCESSING AND MANAGING NUMEROUS SIMULTANEOUS VOICE CONVERSATIONS CONDUCTED BY AN INDIVIDUAL OVER A COMPUTER NETWORK AND COMPUTER METHODS OF IMPLEMENTING THEREOF

CROSS REFERENCE TO RELATED APPLICATIONS

This application is a continuation of U.S. patent application Ser. No. 18/060,307, filed Nov. 30, 2022, entitled "COMPUTER-PROGRAMMED TELEPHONE-EN-ABLED DEVICES FOR PROCESSING AND MANAG-ING NUMEROUS SIMULTANEOUS VOICE CONVER-SATIONS CONDUCTED BY AN INDIVIDUAL OVER A COMPUTER NETWORK AND COMPUTER METHODS OF IMPLEMENTING THEREOF", which is a continuation of U.S. patent application Ser. No. 17/089,943, filed Nov. 5, 2020, entitled "COMPUTER-PROGRAMMED TELE-PHONE-ENABLED DEVICES FOR PROCESSING AND MANAGING NUMEROUS SIMULTANEOUS VOICE CONVERSATIONS CONDUCTED BY AN INDIVIDUAL OVER A COMPUTER NETWORK AND COMPUTER METHODS OF IMPLEMENTING THEREOF", which is a continuation of U.S. patent application Ser. No. 16/150,128, filed Oct. 2, 2018, now U.S. Pat. No. 10,893,149, entitled "COMPUTER-PROGRAMMED TELEPHONE-EN-ABLED DEVICES FOR PROCESSING AND MANAG-ING NUMEROUS SIMULTANEOUS VOICE CONVER-SATIONS CONDUCTED BY AN INDIVIDUAL OVER A COMPUTER NETWORK AND COMPUTER METHODS OF IMPLEMENTING THEREOF", which is a continuation of U.S. patent application Ser. No. 15/842,520, filed Dec. 14, 2017, entitled "COMPUTER-PROGRAMMED TELE-PHONE-ENABLED DEVICES FOR PROCESSING AND MANAGING NUMEROUS SIMULTANEOUS VOICE CONVERSATIONS CONDUCTED BY AN INDIVIDUAL OVER A COMPUTER NETWORK AND COMPUTER METHODS OF IMPLEMENTING THEREOF", which is a continuation of U.S. patent application Ser. No. 14/926,342, filed Oct. 29, 2015, entitled "COMPUTER-PRO-GRAMMED TELEPHONE-ENABLED DEVICES FOR PROCESSING AND MANAGING NUMEROUS SIMUL-TANEOUS VOICE CONVERSATIONS CONDUCTED BY AN INDIVIDUAL OVER A COMPUTER NETWORK AND COMPUTER METHODS OF IMPLEMENTING THEREOF", which is a continuation of U.S. patent appli-cation Ser. No. 14/687,597, filed Apr. 15, 2015, now U.S. Pat. No. 9,178,773, entitled "COMPUTER-PRO-GRAMMED TELEPHONE-ENABLED DEVICES FOR PROCESSING AND MANAGING NUMEROUS SIMUL-TANEOUS VOICE CONVERSATIONS CONDUCTED BY AN INDIVIDUAL OVER A COMPUTER NETWORK AND COMPUTER METHODS OF IMPLEMENTING THEREOF", which claims the priority of U.S. Provisional Application No. 61/979,807, filed Apr. 15, 2014, entitled "COMPUTER-IMPLEMENTED SYSTEMS AND COM-PUTER-IMPLEMENTED METHODS FOR MANAGING A PLURALITY OF SIMULTANEOUS TELEPHONE CONVERSATIONS CONDUCTED BY AN INDI-VIDUAL", and of U.S. Provisional Application No. 62/022, 859, filed Jul. 10, 2014, entitled "COMPUTER-IMPLE-MENTED SYSTEMS AND COMPUTER-IMPLEMENTED METHODS FOR MANAGING A PLURALITY OF SIMULTANEOUS TELEPHONE CONVERSATIONS CONDUCTED BY AN INDIVIDUAL", each of which are incorporated herein by reference in their entirety for all purposes.

TECHNICAL FIELD

In some embodiments, the instant invention is related to computer-programmed telephone-enabled devices for pro-cessing and managing numerous simultaneous voice con-versations conducted by an individual over a computer network, and computer methods of implementing thereof.

BACKGROUND

Traditionally, in some instances, brokers/traders utilize hardware devices called turrets that are equipped with microphones and speakers and that sit on the trader's desk awaiting various buttons to be pushed that instruct the voice data where to be carried and how.

SUMMARY OF THE INVENTION

In some embodiments, the instant invention provides for a computer-implemented method, including: causing, by a specifically programmed computer call management com-munication system, to transform, over a computer network, a plurality of computing devices of a plurality of users, into a corresponding plurality of specialized call management devices, by having each computing device to execute a specialized call management client software application being in electronic communication with the specifically programmed computer call management communication system over the computer network by utilizing at least a session initiation protocol (SIP); where the specialized call management client software application, upon the execu-tion, generates a plurality of specialized graphical user interfaces configured to allow each user of the plurality of users to concurrently initiate and maintain, over the com-puter network, a plurality of voice communications of distinct types with other users based, at least in part, on: maintaining each voice communication independent from another voice communication; generating an individual visual control panel for each voice communication of the plurality of voice communications, where the individual visual control panel comprises: a plurality of visual audio device control icons which are respectfully programmed, upon selection, to: i) independently and dynamically divert, in real-time, any voice communication of any type to any audio device associated with a corresponding specialized call management device of such user; ii) independently manage, in real time, each voice communication by at least: 1) putting such voice communication on hold, 2) muting such voice communication, 3) unmuting such voice com-munication, 4) joining a particular voice communication with at least one other voice communication, 5) disjoining the particular voice communication from the at least one other voice communication, 6) allowing independent inter-action by each user with the particular voice communica-tion, and 7) enabling each user to select for each voice communication a particular communication mode, where the particular communication mode is one of push-to-talk mode and b) a continuous talk mode; where the individual visual control panel for each voice communication is con-figured to be detachable from a parent window of the specialized call management client software application so that each user can move the individual visual control panel to any location on a screen of a respective specialized call management device; and where the plurality of voice communications comprise voice communications of at least one of the following connection types: dialed phone connection, ii) a Hoot connection, and iii) a Ringdown connection.

In some embodiments, the exemplary computer-implemented method of the present invention further includes: encrypting, by the specialized call management client software application, each voice communication of the plurality of voice communications.

In some embodiments, the exemplary computer-implemented method of the present invention further includes: tracking, in real-time, by the specifically programmed computer call management communication system, the plurality of voice communications to generate call history and use statistics on real-time basis; and causing to display, by the specifically programmed computer call management communication system, at least one automatically updatable visual dashboard configured to present the call history and the use statistics to an administrator user.

In some embodiments, the exemplary computer-implemented method of the present invention further includes: transcribing, in real-time, by the specialized call management client software application, each voice communication.

In some embodiments, the exemplary computer-implemented method of the present invention further includes: data mining, in real-time, by the specifically programmed computer call management communication system, the transcribed voice communications based on at least one predetermined parameter.

In some embodiments, the plurality of users are securities trading professionals and where the at least one pre-determined parameter is associated with at least one trading compliance requirement.

In some embodiments, the exemplary computer-implemented method of the present invention further includes: outputting, in real-time, by the specialized call management client software application, the transcribed voice communications of a particular time length into a chat box.

In some embodiments, the particular time length is between 5 and 30 seconds.

In some embodiments, the exemplary specialized call management client software application is further programmed to: enable, each user, to create, in real-time, a group of users utilizing a plurality of Hoot connections; and broadcast, in real-time, at least one voice communication to the group of users utilizing the plurality of Hoot connections.

In some embodiments, the exemplary specialized call management client software application is further programmed to enable each user to switch between a minimized display of the plurality of specialized graphical user interfaces and a full-screen display of the plurality of specialized graphical user interfaces; where the minimized display occupies a portion of a screen of each respective specialized call management device of a particular user; and where the full-screen display occupies the entire screen of such respective specialized call management device of the particular user.

In some embodiments, the instant invention provides for a specifically programmed computer call management communication system, having at least the following modules: at least one specialized server specifically programmed with specialized call management software application stored on a non-transient computer readable medium, where the specialized server, upon execution of the specialized call management software application is configured to at least perform: causing to transform, over a computer network, a plurality of computing devices of a plurality of users, into a corresponding plurality of specialized call management devices, by having each computing device to execute a specialized call management client software application being in electronic communication with the specifically programmed computer call management communication system over the computer network by utilizing at least a session initiation protocol (SIP); where the specialized call management client software application, upon the execution, generates a plurality of specialized graphical user interfaces configured to allow each user of the plurality of users to concurrently initiate and maintain, over the computer network, a plurality of voice communications of distinct types with other users based, at least in part, on: maintaining each voice communication independent from another voice communication; generating an individual visual control panel for each voice communication of the plurality of voice communications, where the individual visual control panel comprises: a plurality of visual audio device control icons which are respectfully programmed, upon selection, to: i) independently and dynamically divert, in real-time, any voice communication of any type to any audio device associated with a corresponding specialized call management device of such user; ii) independently manage, in real time, each voice communication by at least: 1) putting such voice communication on hold, 2) muting such voice communication, 3) unmuting such voice communication, 4) joining a particular voice communication with at least one other voice communication, 5) disjoining the particular voice communication from the at least one other voice communication, 6) allowing independent interaction by each user with the particular voice communication, and 7) enabling each user to select for each voice communication a particular communication mode, where the particular communication mode is one of a) a push-to-talk mode and b) a continuous talk mode; where the individual visual control panel for each voice communication is configured to be detachable from a parent window of the specialized call management client software application so that each user can move the individual visual control panel to any location on a screen of a respective specialized call management device; and where the plurality of voice communications comprise voice communications of at least one of the following connection types: i) a dialed phone connection, ii) a Hoot connection, and iii) a Ringdown connection.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
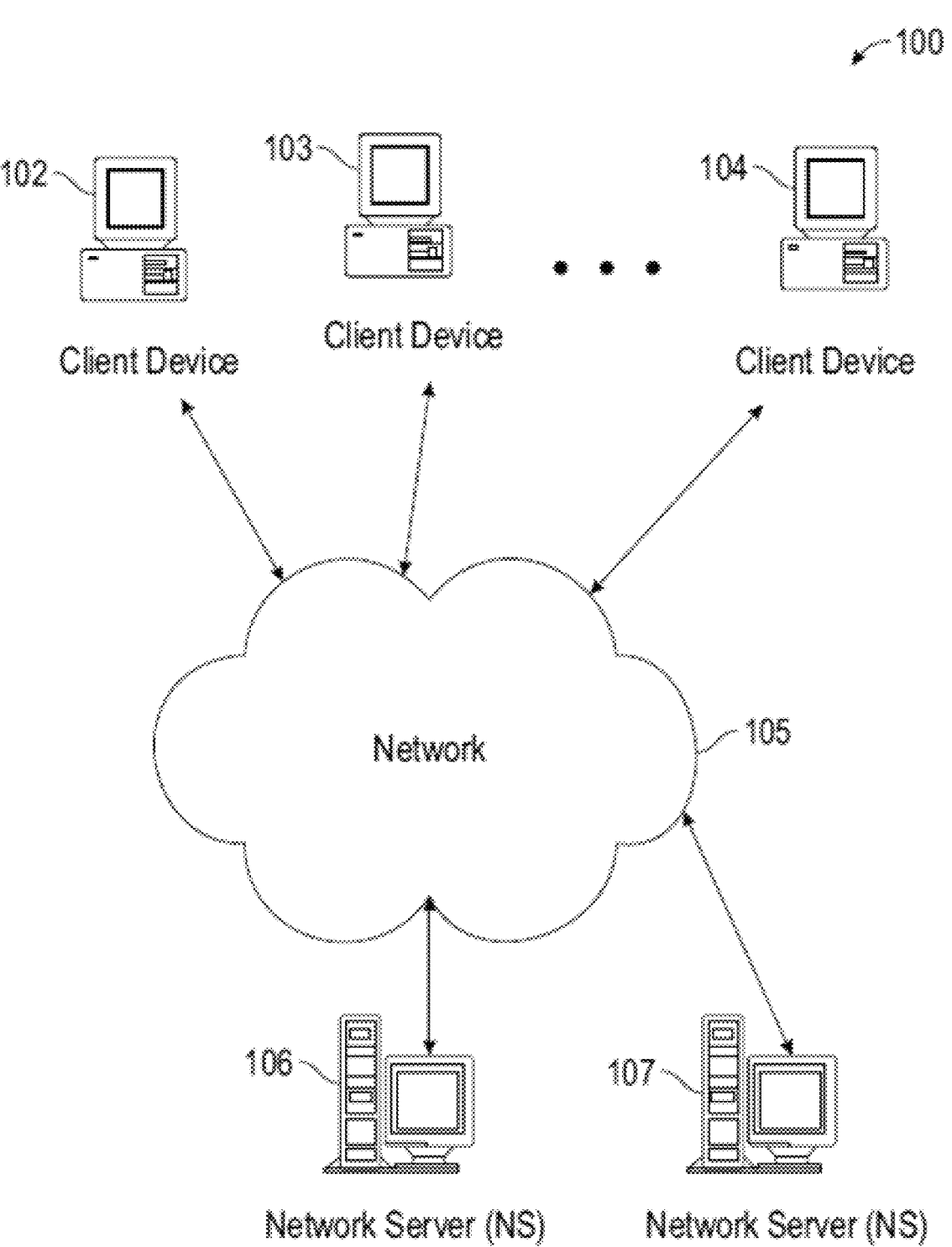
FIGS. 1-3B are diagrams of computer architecture showing some aspects of some embodiments of the present invention, such as electronic communication over a computer network, computing devices executing specialized client applications, and specifically programmed network servers.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, hut merely as a representative basis for teaching one skilled in the art to variously employ the present invention.

DETAILED DESCRIPTION OF EXEMPLARY EMBODIMENTS

Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

in addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "and," and "the" include plural references. The meaning of "in" includes "in" and "on."

It is understood that at least one aspect/functionality of various embodiments described herein can be performed in real-time and/or dynamically. As used herein, the term "real-time" is directed to an event/action can occur instantaneously or almost instantaneously in time when another event/action has occurred, In some embodiments, the terms "instantaneous," "instantaneously," "instantly," and "in real time" refer to a condition where a time difference between a first time when a request for confirmation of the user's identifying characteristic(s) is transmitted and a second time when a response to the request is received is no more than 1 minute. In some embodiments, the time difference between the request and the response is no more than 1 second. In some embodiments, the time difference between the request and the response is between less than 1 second and 1 minute, As used herein, the term "dynamic(ly)" is directed to an event/action that can occur without any human intervention. In some embodiments, the dynamic event/action may be in real-time, hourly, daily, weekly, monthly, etc.

Illustrative Examples of Cloud Telecom Infrastructure

In some embodiments, the terms "SoftPhone," "soft client telephone," "soft telephone client," and "Trader.sup.-Voice Box" are utilized herein to identify the inventive software/hardware implementations in accordance with the present invention which provide a set of voice communication capabilities to allow individuals/users, such as, but not limited to, brokers and/or traders, to communicate with one another over secure, recorded lines that span the globe.

Figure 3A:
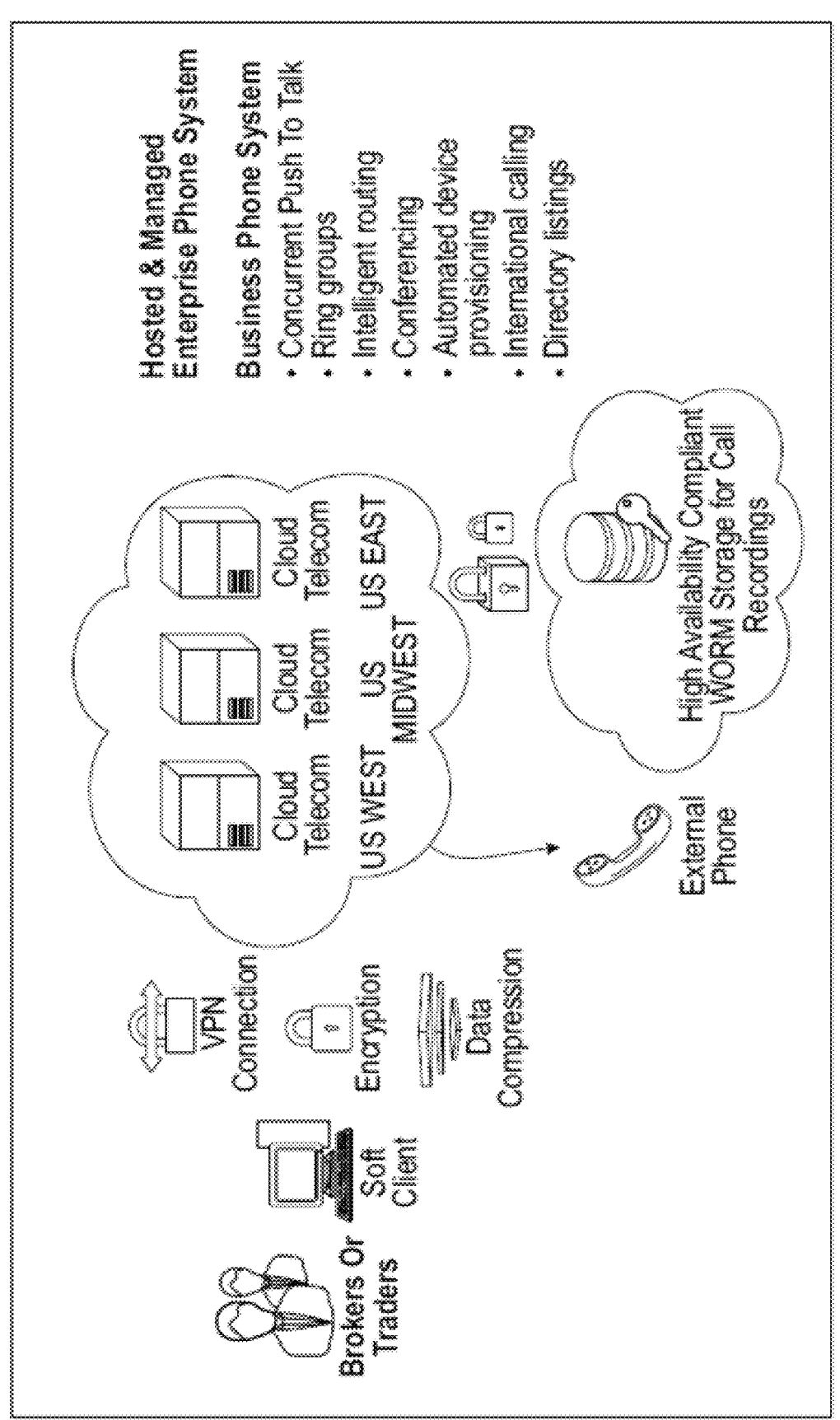
Figure 3B:
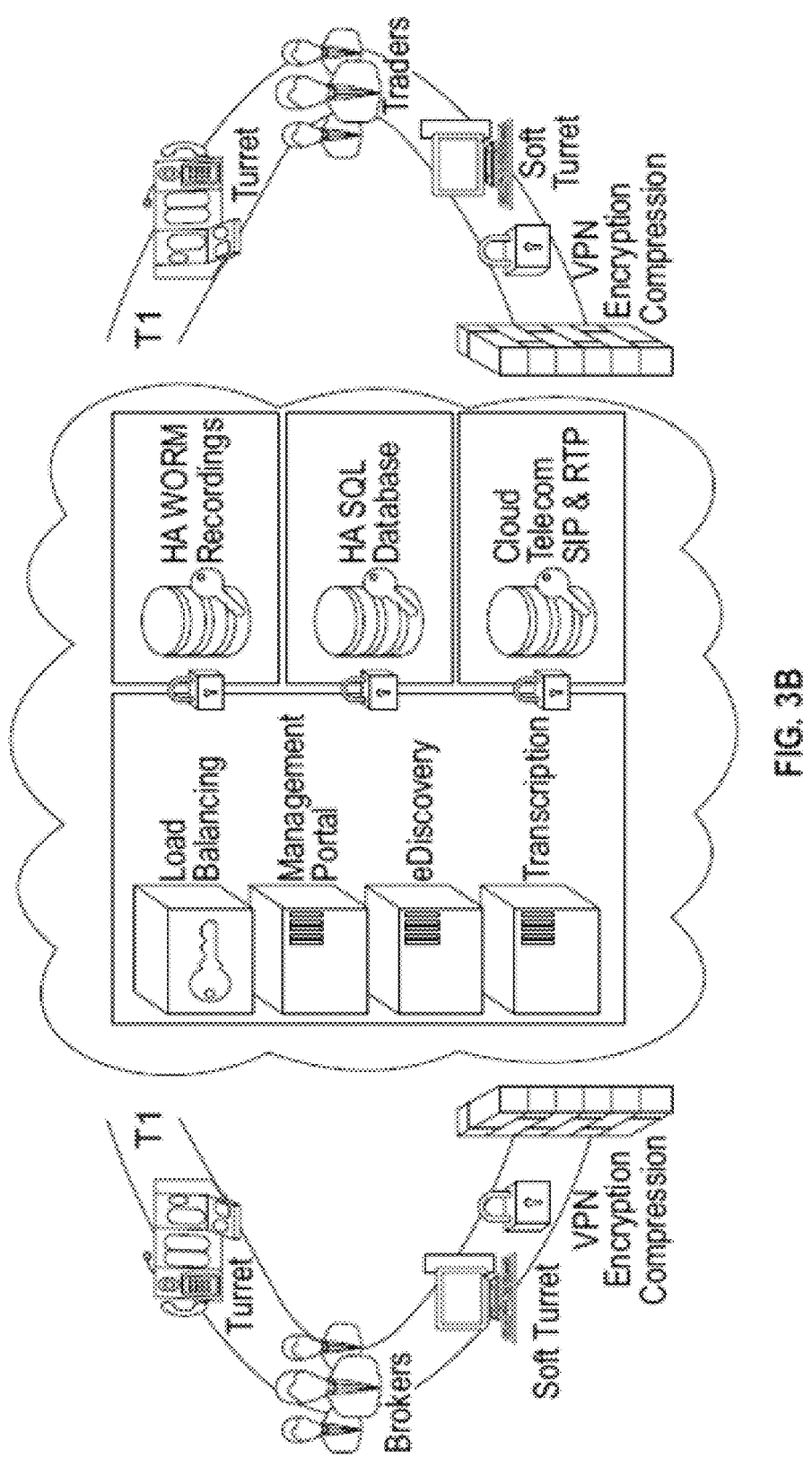

In some embodiments, as shown in FIGS. 3A and 3B, the present invention utilizes a Voice Over IP (VoIP) technology applications, leveraging "cloud" telecom (telecomputing) and storage capabilities. In some embodiments, the present invention enables individuals (e.g., global financial market participants) to rapidly set up and instantly speak on private, secure voice networks without hardware. In some embodiments, communication takes place using a downloadable software client that is installed on the user's PC connecting over the internet into a provider's cloud telecom infrastructure. In some embodiments, as shown in FIGS. 3A and 3B, the specially programmed computer system of the present invention utilizes multi-thread processing and utilizes multiple SIP channels over a cloud computing architecture to allow users to launch dozens of conversations simultaneously.

In some embodiments, the inventive systems of the present invention can utilize Java, with platform specific native functionality and can be deployed across Windows, Mac and Linux PCs. In some embodiments, the inventive systems of the present invention can utilize communication standards based Session Initiation Protocol (SIP) functionality in order to provide communication functionality (e.g., voice and video calls) between users.

In some embodiments of the present invention, each conversation remains independent of one another allowing the user to put them on hold, group them together, and/or interact with them one-by-one. In some embodiments, the present invention can offer at least two capabilities for conversations to take place: 1) in a push-to-talk mode and 2) a continuous mode. In some embodiments of the present invention, the push-to-talk mode can be utilized by individuals (e.g., brokers, active traders) as way to conduct the short burst of conversations for a fast pace information exchange. In some embodiments of the present invention, the user can utilize the "continuous mode" to conduct a more lengthy conversation. In some embodiments, the inventive systems of the present invention allow users to switch a call, while in progress, from push-to-talk to continuous mode and vice versa. In some embodiments, the inventive systems of the present invention allow users to have conversations in push-to-talk mode to occur on a device such as a speaker and microphone so that their colleagues around them can hear the dialogue as well. In some embodiments, the inventive systems of the present invention allow the users to have conversations, which are in continuous ode, to occur on a separate device, such as a USB headset, so that privacy is maintained.

Figure 4:
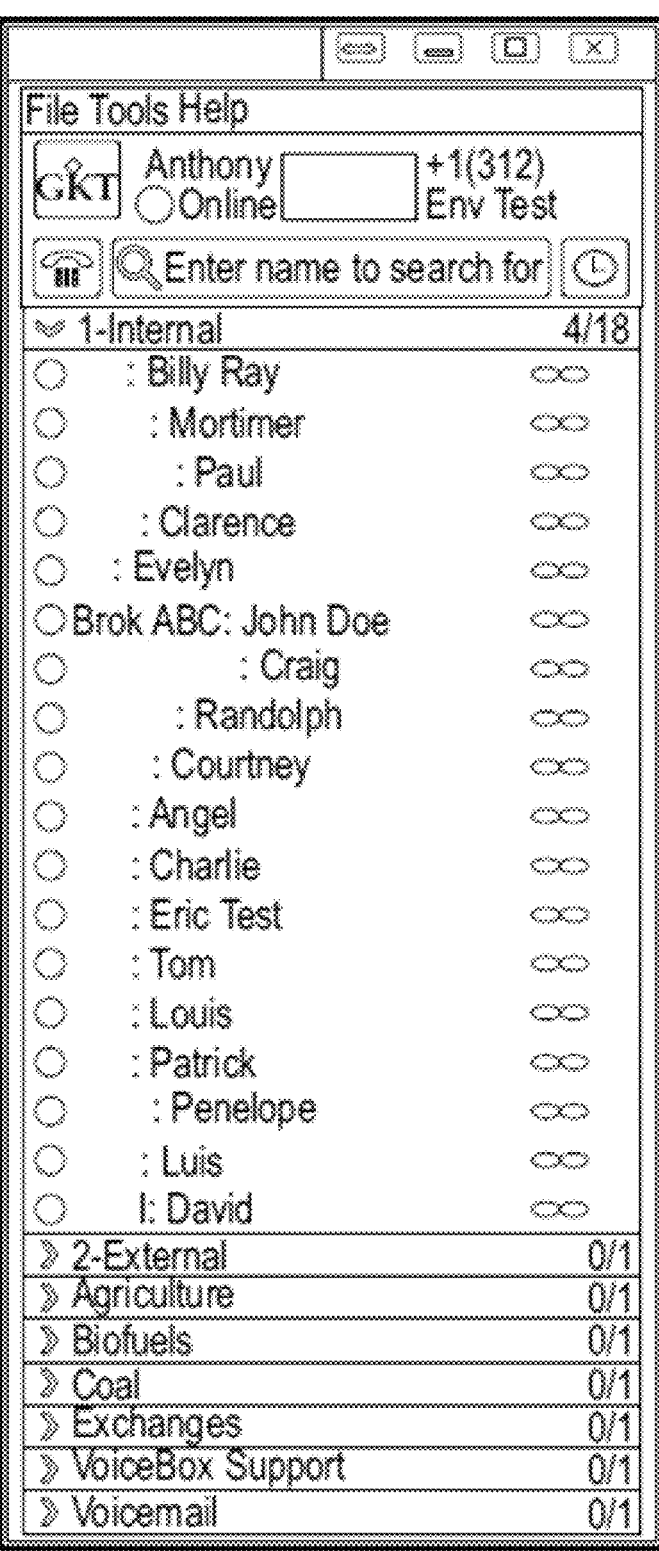
FIG. 4-33 are screenshots illustrating various particular aspects related to some embodiments of the present invention.

In some embodiments, e.g., as shown in FIG. 4, the inventive systems of the present invention offer the users the ability to call numerous people at the same time (e.g., at least 12) and to categorize each call/conversation on the fly, in real-time, as "push-to-talk" or as "continuous" mode. In some embodiments of the present invention, the call mode can be changed during the call. In some embodiments of the present invention, depending on the call mode, voice is routed to the audio device the user has specified should receive and emit that voice data. In some embodiments, the inventive systems of the present invention allow the users to set up and maintain their audio profile preferences.

Illustrative Examples of Creating an Outgoing Call

SIP Call Process

Figure 5:
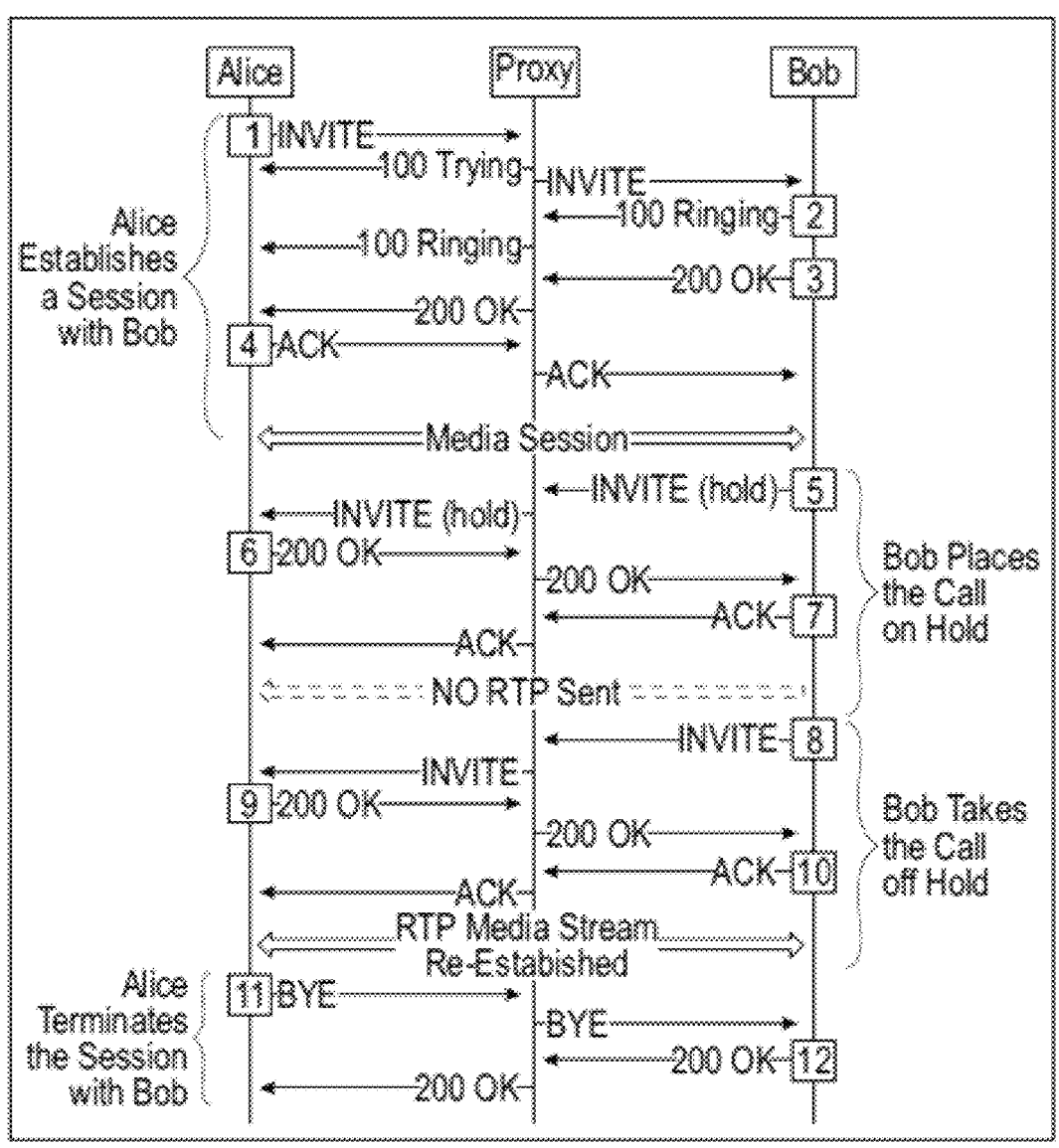

In some embodiments, as shown in FIG. 5, an instance of the specialized software programmed in accordance with the present invention transforms a user's computing devices (e.g., a desktop computer, laptop, smartphone, etc.) into the inventive soft client telephone of the instant invention which can establish a call with one of many other inventive soft clients of other users and a series of standard instructions are passed back and forth between two users using a real-time transport protocol (RIP) such as the session initiated protocol (SIP) documented in RFC 5359 (https://tools.ietf.org/html/rfc5359) whose description, including descriptions of any associated RFC SIP protocols identified in RFC 5359, are incorporated herein by reference for such purpose.

Illustrative Examples of Trader Voice Box: Concurrent Calls Functionality

Creating Concurrent Calls

In some embodiments of the present invention, each call created triggers its own thread of resources on a modem PC. In some embodiments of the present invention, each inventive call box is replicated on separate threads, simply by duplicating the current thread each time the request to establish a new call was invoked. In some embodiments, by spawning call functions on to separate threads, the inventive systems of the present invention allow the users to utilize a technique similar to "copy paste" to create dozens of concurrent calls at once.

Figure 6:
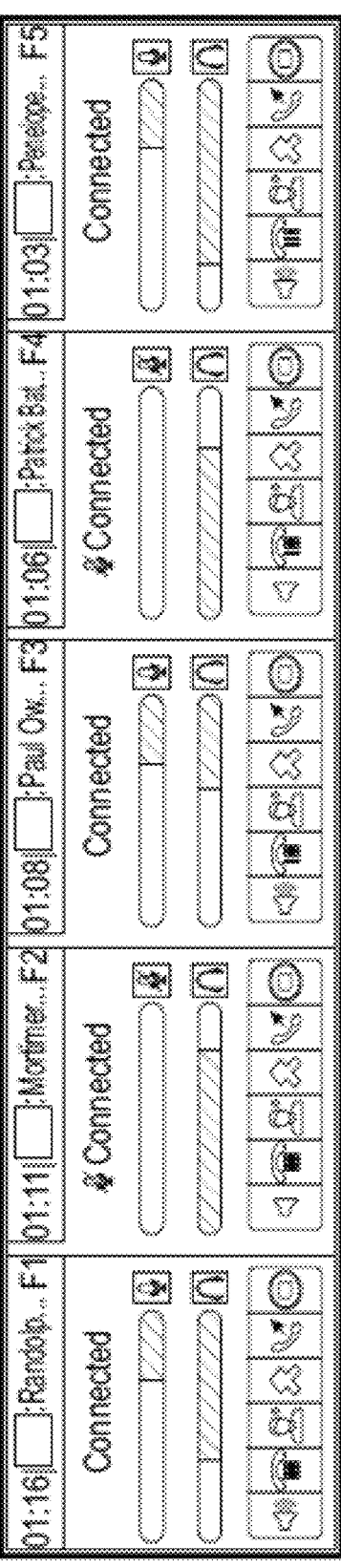

In some embodiments, the inventive systems of the present invention, such as the Trader Voice Box, allow users to conduct, for example, as shown in FIG. 6, 5 different encrypted calls that are concurrently occurring. In some embodiments, the inventive systems of the present invention allow a user to have, for example, 2, 3, 4, 5, 6, 7, 8, 9, 10, 11, 12, 13, 14, and/or 15 separate, security encrypted phone calls at the same time with none of the opposite callers being aware. In some embodiments, these phone calls of FIG. 6 are agnostic as to particular audio device(s), and be, real-time, reassigned between audio devices (speaker 1, speaker 2, audio jack 1, audio jack 2, etc.),

Illustrative Examples of Dynamic Audio Routing Functionality

Figure 7A:
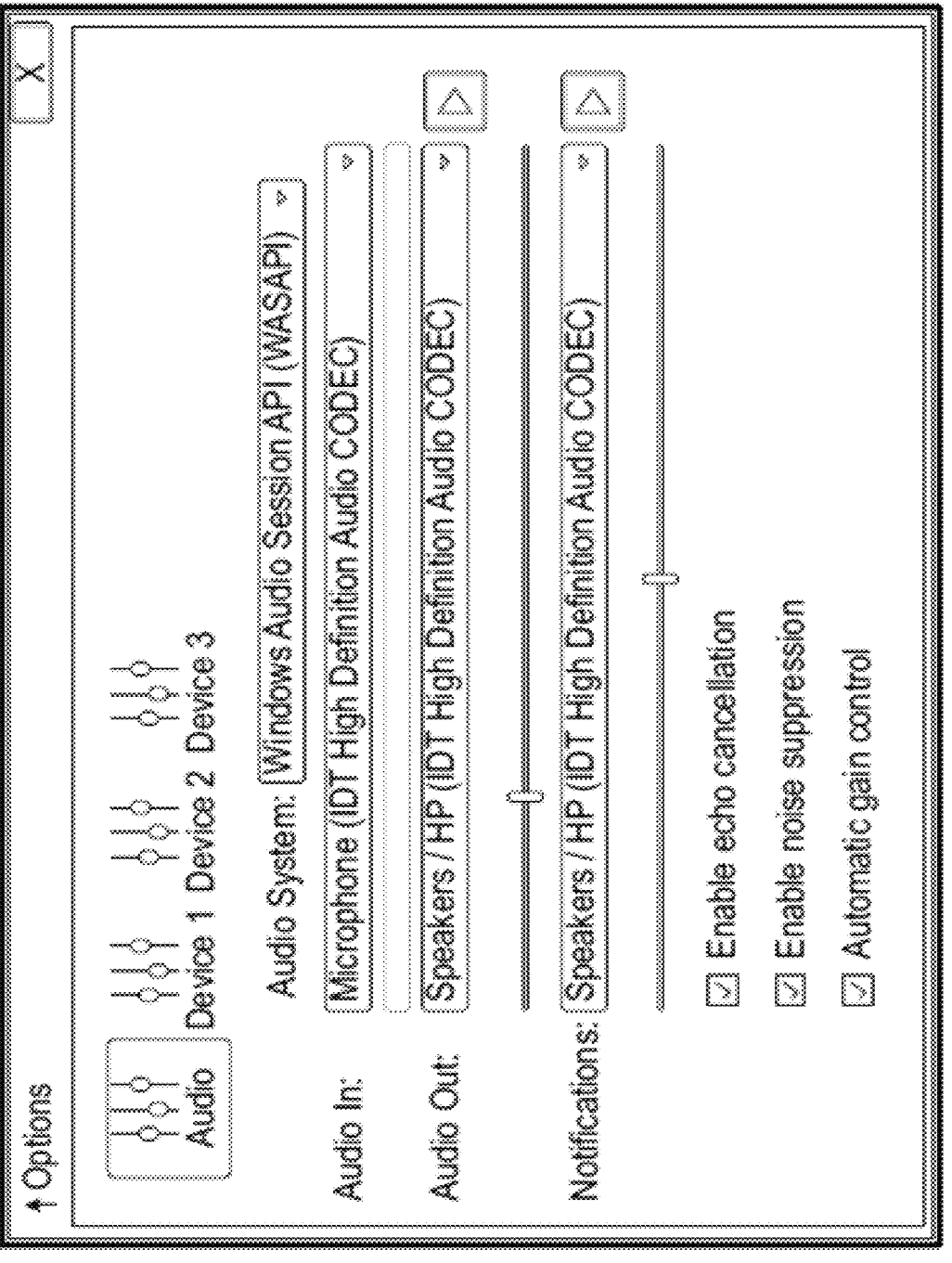
Figure 7B:
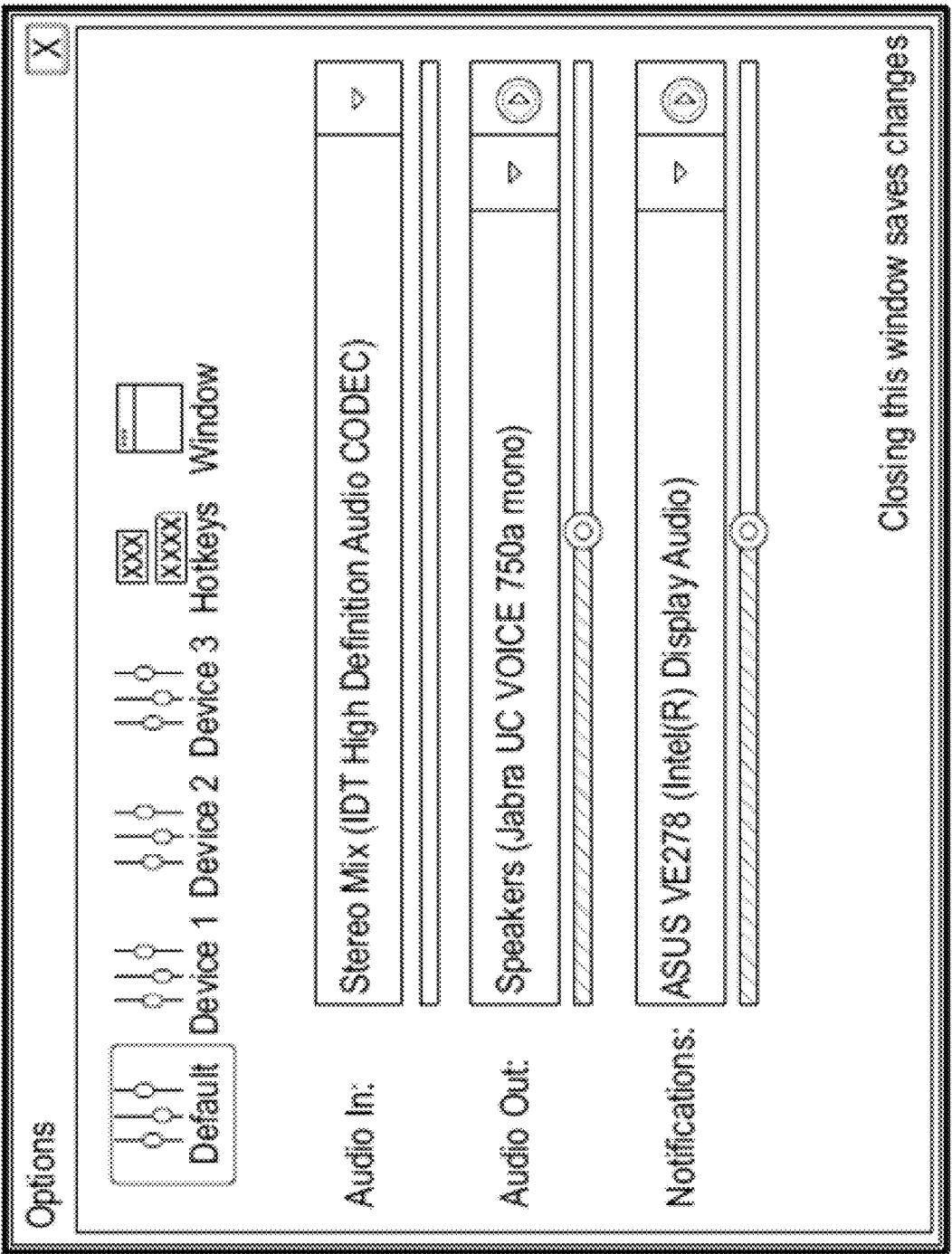

In some embodiments, e.g., as shown in FIGS. 7A and 7B, the inventive systems of the present invention allow to manage, for example, numerous concurrent calls (e.g., 5 concurrent calls of FIG. 6), where (1) each call requires the audio in & audio out to occur over the same exact audio port and/or (2) there are multiple audio devices connected to a computing device that a user uses (e.g., a PC, smartphone, tablet, etc.). In some embodiments, the inventive systems of the present invention can detect multiple audio devices plugged into the computing device and allow the users to dynamically switch calls between audio devices with one click. You can use multiple audio devices at the same time. In some embodiments, e.g., as shown in FIGS. 7A and 7B, users can set up different audio devices for phone calls to external contacts and Direct Connections Hoots (e.g., there is a permanent open circuit between two or more parties) and Ringdowns (e.g., one-way and or two-ways automatic ringdown circuits).

Figure 8:
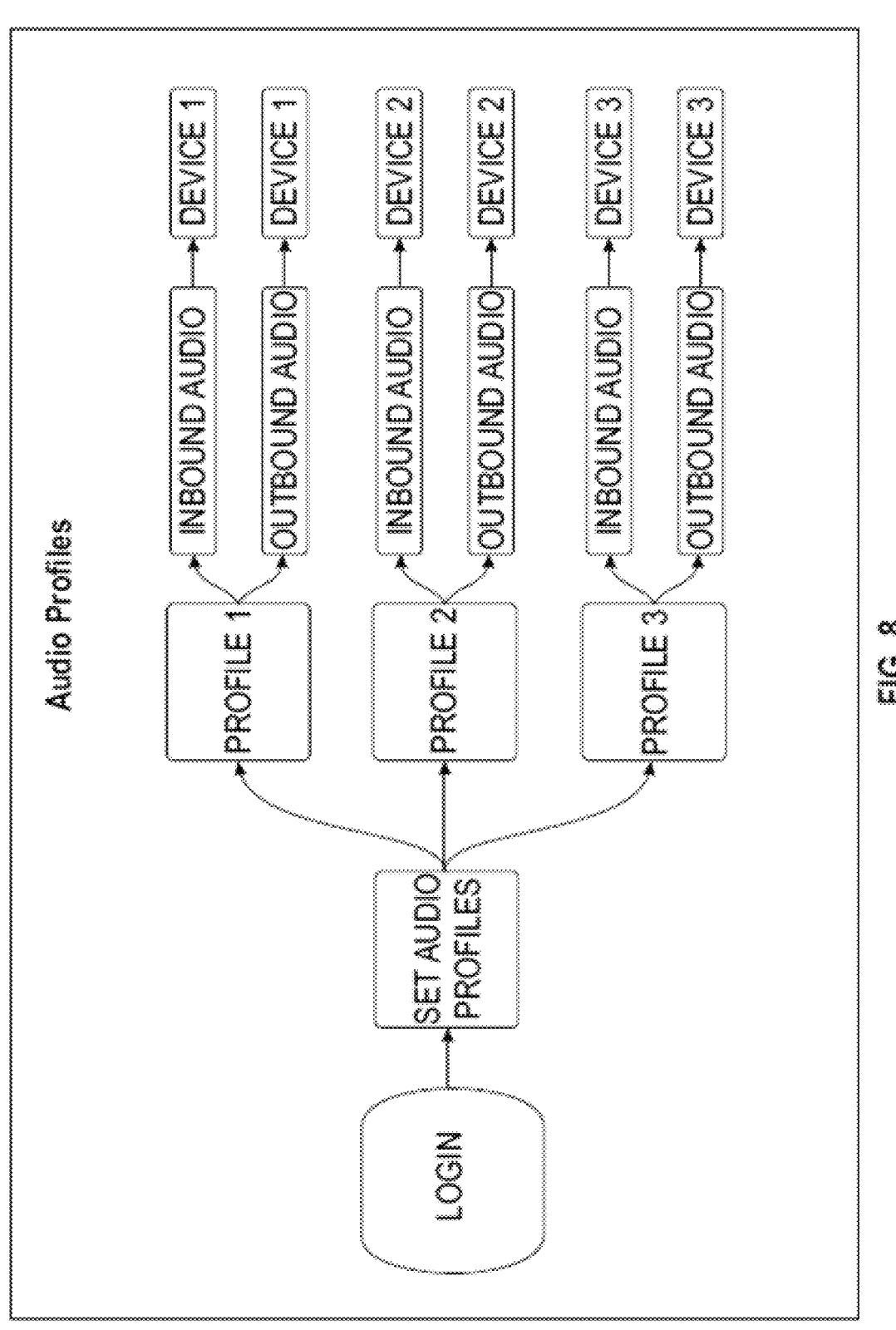
Figure 9:
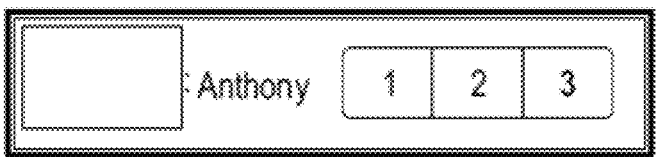

FIG. 8 illustrates some embodiments of the present invention, the following procedure can be, for example, used: Trader Voice Box tools>options>audio. In some embodiments of the present invention, a user is able to set multiple USB audio device profiles, which allows concurrent sounds to be assigned to specific devices rather than all sound going in and out the same device. In some embodiments, the specifically programmed computer system, residing at servers in the cloud architecture, or specifically programmed soft phone clients, or both, are configured/programmed to automatically transcribed all conversions in real-time and subject the resulting voice transcription data to data mining based predetermined keywords, concepts, library of terms, etc. (for example, for purposes of trading compliance monitoring). In some embodiments of the present invention, as illustrated in FIG. 9, when a call rings, the user can accept that call on Audio device 1, 2 or 3 which makes it much easier for the user to communicate with the concurrent calls already in place. In some embodiments of the present invention, for an incoming call, a user can select which audio device to pickup the call on.

Figure 10:
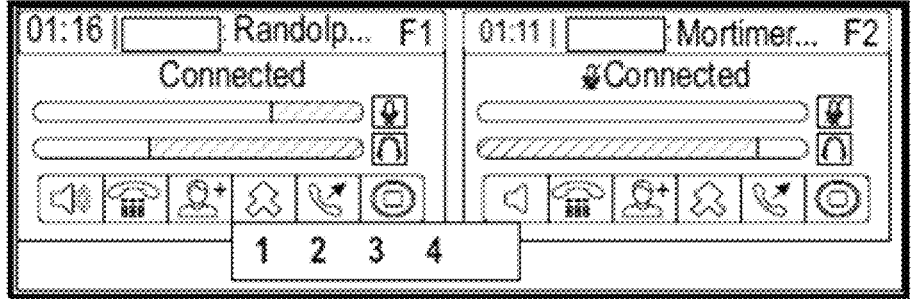

FIG. 10 illustrates some embodiments in which the inventive systems of the present invention allow the user, during the call, to transfer the caller from one audio device to another and back making the audio routing dynamic.

Figure 11:
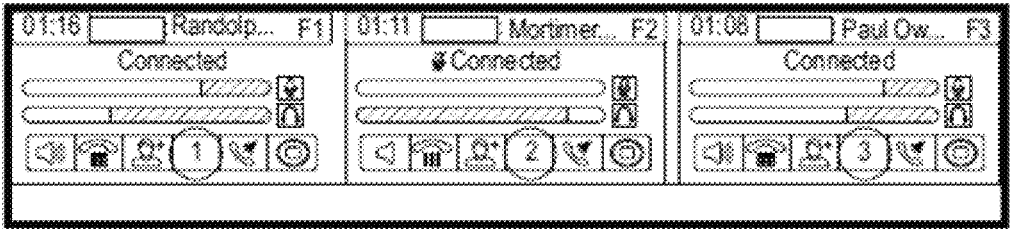
Figure 13A:
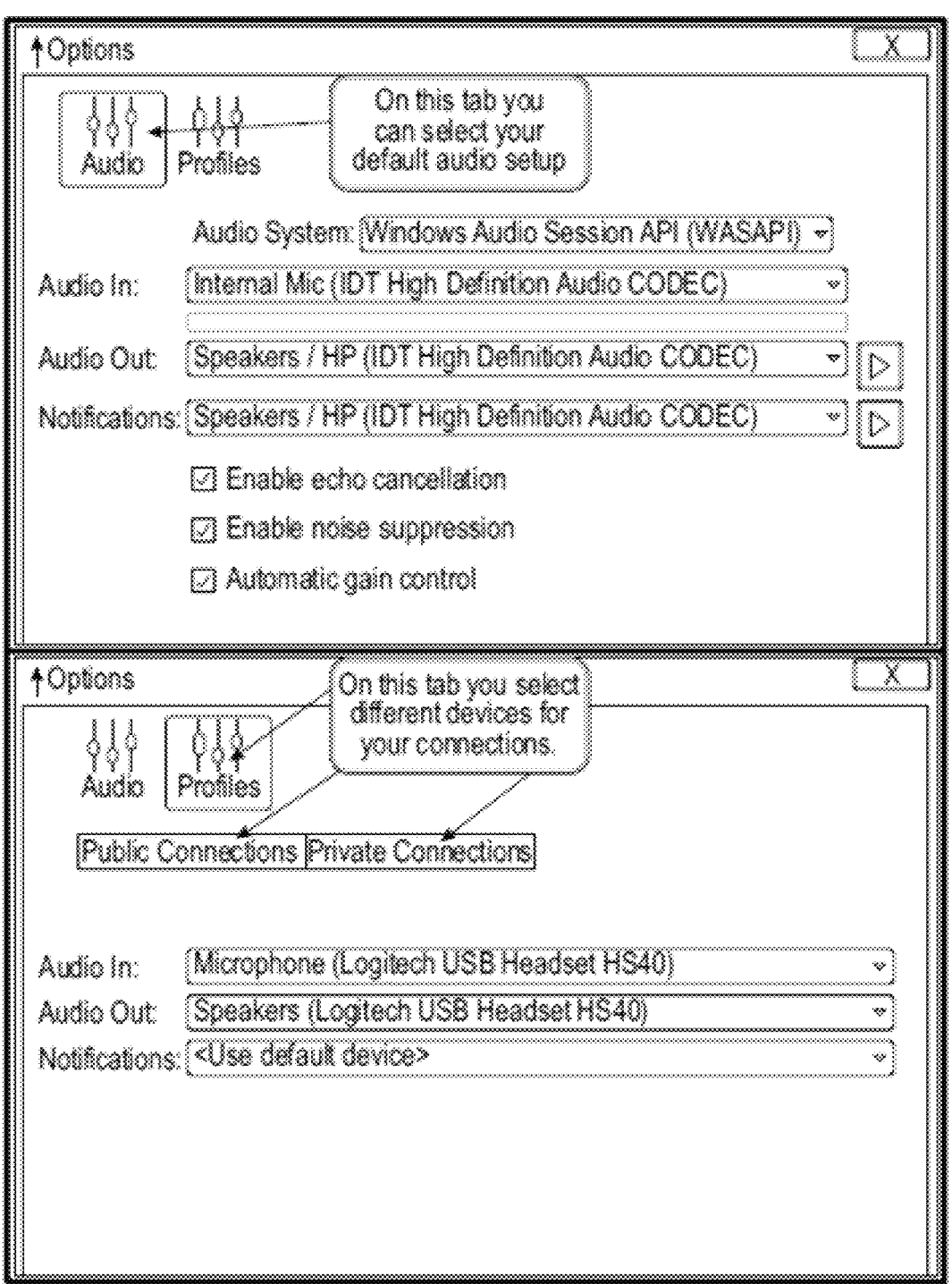

In some embodiments, as shown in FIG. 11, the inventive systems of the present invention recognize multiple audio devices and route audio in and audio out, concurrently, across multiple devices at the same time. For example, in FIG. 11, Device 1 can be Jabra 410s Speaker/Microphone, Device 2 can be Logitech 540 Headset, and Device 3 can be Eco Logic Handset. In some embodiments, the assignment of particular audio device(s) to a particular telephone conversation can be set utilizing an audio profile functionality of the invention soft telephone client (e.g., as shown in FIG. 13).

Figure 12:
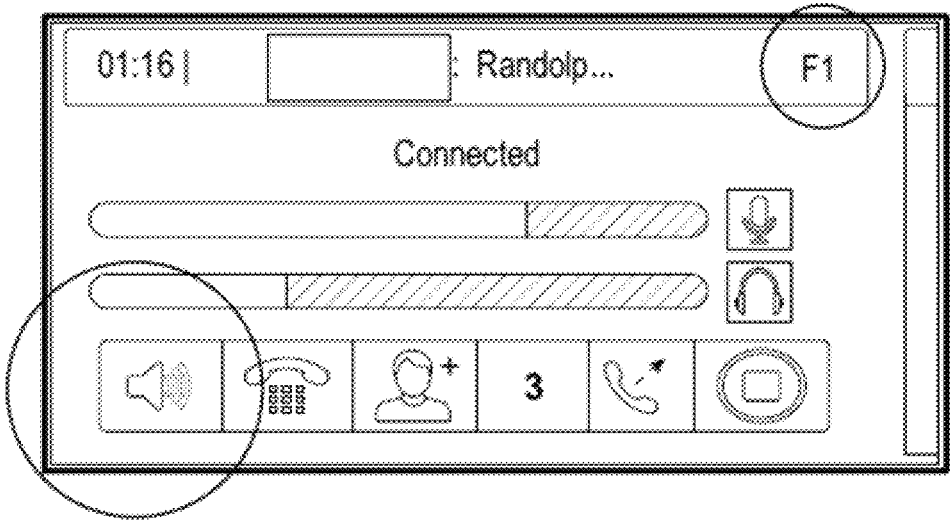

Illustrative Examples of Hot Key Push to Talk Functionality in some embodiments, the inventive systems/methods of the present invention offer a software-based solution for "push to talk" or walk-talkie like functionality. In some embodiments, the inventive systems of the present invention offer a software programmed functionality that enables a user to place a call and to then put that call in "push-to-talk" mode by using, for example, keyboard shortcut(s). In some embodiments, the inventive systems of the present invention offer a software functionality that essentially turns the user's keyboard into a walkie-talkie. In some embodiments, as shown in FIG. 12, the inventive systems of the present invention allow the user to dynamically switch from the push-to-talk mode to the continuous mode at the stroke of a preprogrammed key. In some embodiments of the present invention, the user clicks the "speaker" icon in the bottom left hand corner to toggle on "push-to-talk." In some embodiments of the: present invention, the user pushes down the hot key shown in the top right corner, such as F1, to "shout down" to the caller on the other end. In some embodiments of the present invention, once the F1 button is released, the line is muted, while the user awaits a response from their counterparty.

In some embodiments, the inventive systems of the present invention allow the user to configure the caller's mode on the fly and can be dynamically changed again and again instantly, as well as be routed across different audio devices instantly and/or concurrently.

As shown in figures (screenshots), for the financial applications, the inventive systems/methods of the present invention can utilize the shown exemplary process for users to download, install, and launch the Trader Voice Box Virtual Private Network (VPN) which is an exemplary system programmed in accordance with the present invention.

In some embodiments, the inventive systems/methods of the present invention utilize at least a two-factor authentication that can include at least: 1) a user will receive an email with the two-factor authentication QR code to generate an access key; 2) a user can download the Google Authenticator from the App Store or Play Store depending on a smart phone device; and/or 3) the two factor authentication is available as an extra security measure upon a specific request.

In some embodiments, the user utilizes user credentials and access key to log in. In some embodiments of the present invention, an access key will change at a predetermined time intervals (e.g., every 30 seconds). In some embodiments of the present invention, an access key is not required and is available as an extra security measure upon a specific request, In some embodiments, the inventive systems of the present invention allow the user to change the sound options by clicking corresponding options in software tools programmed in accordance with the present invention. In some embodiments of the present invention, a user can have different audio devices setup for each of calls/connections. In some embodiments of the present invention, the user can setup audio device profiles by, for example, selecting which device the user wants to use for a private connection(s) and/or a public call(s). In some embodiments of the present invention, to make a call and/or a private connection, the user can double click on the contact the user wishes to call. In some embodiments of the present invention, to make a public call, a user clicks on the phone icon and the dial pad will appear.

Illustrative Examples of Setting Up the Inventive Systems/Methods of the Present Invention (e.g., Trader Voice Box)

Illustrative System Requirements

In some embodiments of the present invention, the inventive soft client of the present invention can be executed on the following minimal system requirements: Windows b7 (x86 or x64), WASAPI installed, modern CPU, 2 GB RAM, 200 MB free hard disk space, integrated or external sound card, PC speakers and microphone, and Java virtual machine.

In some embodiments of the present invention, to login to the inventive systems of the present invention, a user is required to enter an email address and the password created.

In some embodiments of the present invention, to setup an account and/or update a user profile page, the user can enter at least the following data: first name, last name, email, external phone 1 and/or external phone 2. In some embodiments, the inventive systems of the present invention utilize of the present invention, click the validate and submit button.

In some embodiments of the present invention, an instance of the inventive soft telephone client (e.g., the exemplary application Trader Voice Box) can start either manually or be set-up to start automatically (e.g., at booting, at a set time, at a certain trigger occurs, etc.). In some embodiments, an instance of the inventive soft telephone client (e.g., the exemplary application Trader Voice Box) can also automatically establish (e.g., dial-up) or re-establish at start-up and/or at pre-determined time and/or at predetermined trigger occurrence, or any combination thereof, one or more telephone conversations without any human interaction (e.g., based on a default list of contacts).

Figure 14:
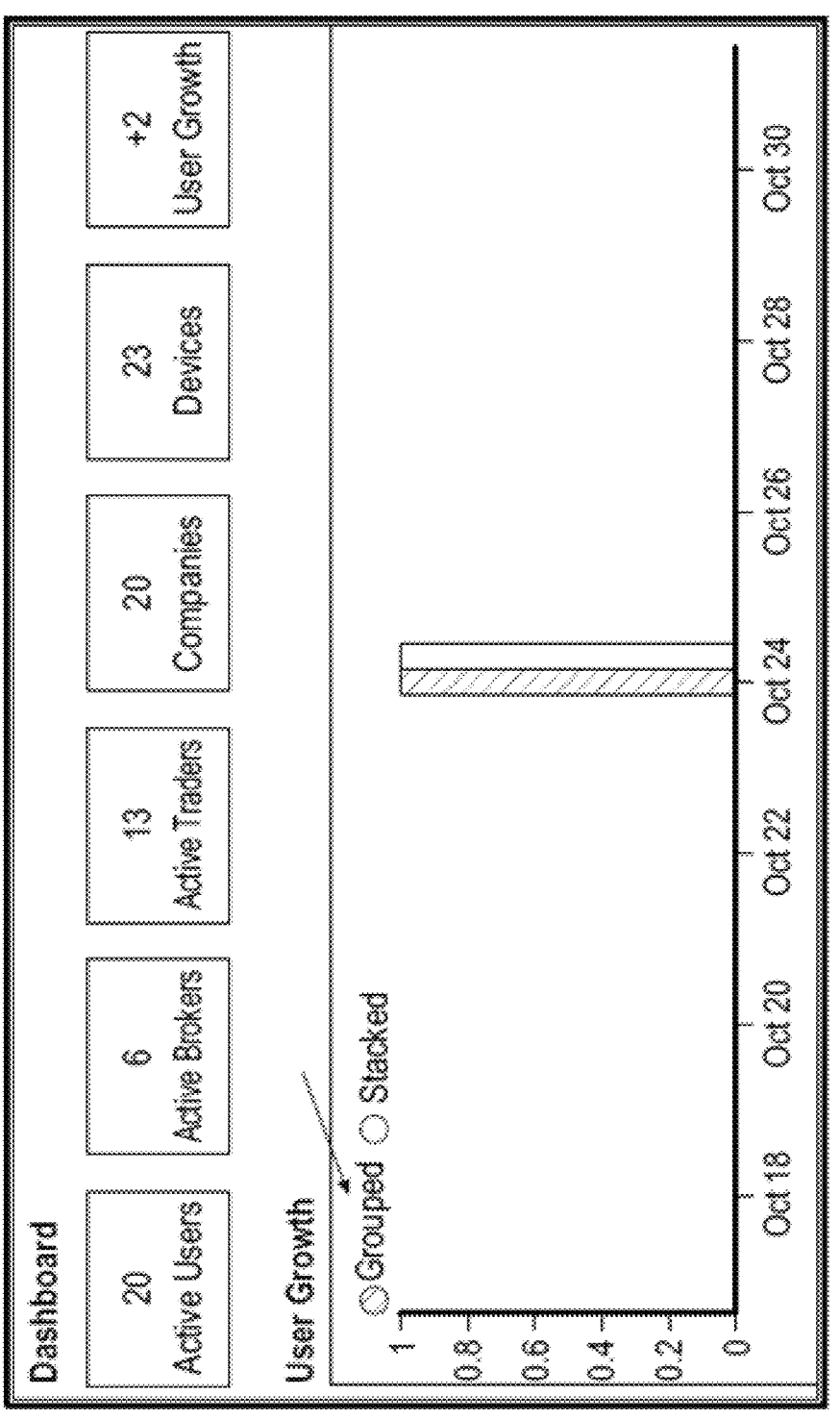
Figure 15:
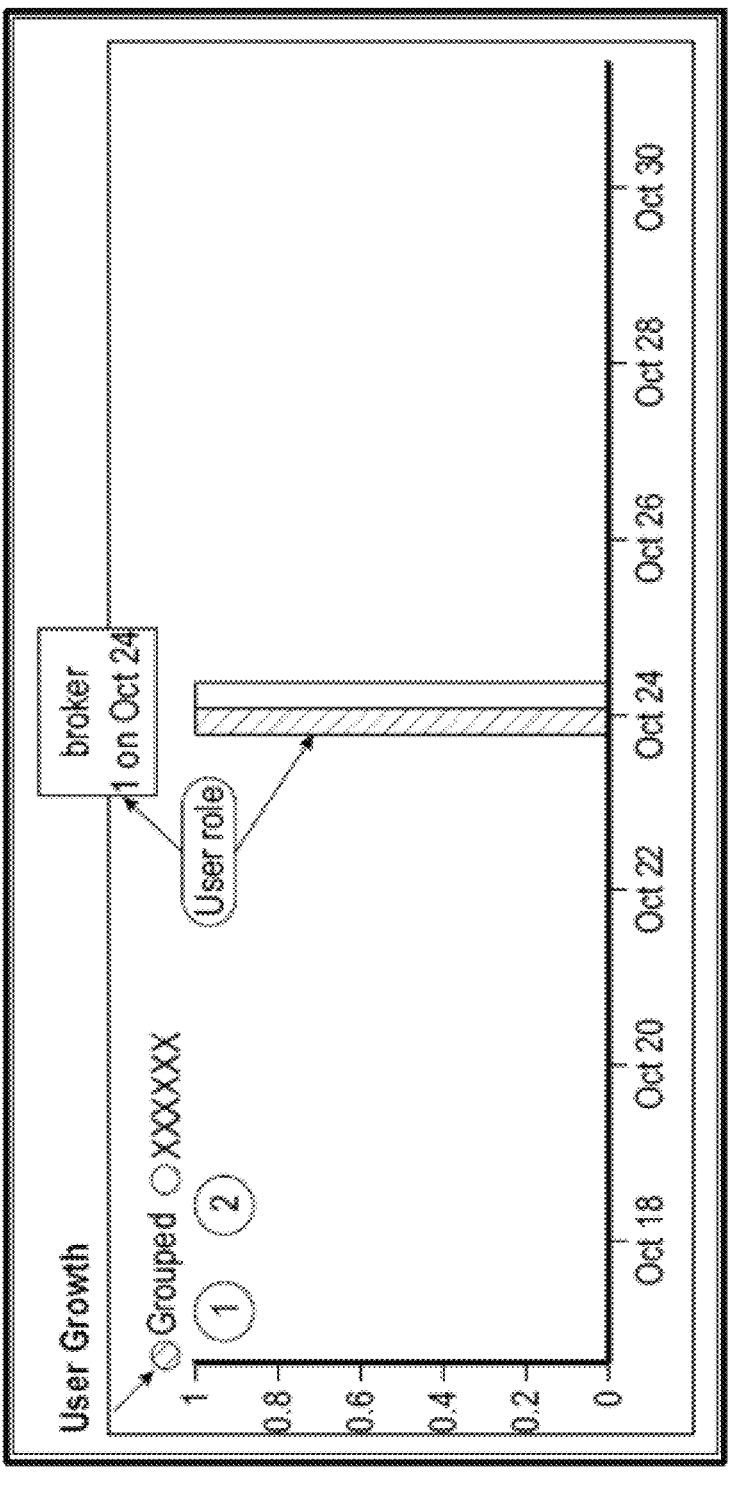

As shown in FIGS. 14-15, in some embodiments, the inventive specifically programmed computer system of the present invention is programmed to provide a specifically programmed real-time automatically updatable, virtual network-based management portal (for example, referenced herein as "Dashboard") to monitor and administer users' (e.g., subordinates) activity within the system (e.g., telephone conversations activity). For example, the Dashboard can provide specific information and statistics about at least one of the following, but not limited to: users, active users (e.g., active brokers), user contacts, companies, call recording and/or static contact, user growth. In some embodiments, the Dashboard is configured to provide various information/statistics such as, but not limited to, a view of who is on the call(s), callers' numbers and/or names, listen in on a call, etc. In some embodiments, the Dashboard is configured to be used in real-time productivity and/or compliance surveying and is configured to allow the administrator to take action(s) regarding any activity such as, but not limited to, interrupt a call, join the call, send a message to call's participant(s), print and/or electronically share transcript of call(s) in real-time as it being recorded, etc.

As shown in FIGS. 14-15, in some embodiments of the present invention, administrator-user can filter the user growth by at least following types: 1) grouped and/or 2) stacked. In some embodiments of the present invention, a user hovers his/her mouse cursor over the color bar, and specific user role growth information will pop up.

In some embodiments of the present invention, information about companies can be accessed through any one of several Company sub-menu items of the inventive soft telephone client to perform the following, but not limited to: show companies, add new companies, show companies types, and/or add company type, or any combination thereof. In some embodiments of the present invention, the inventive soil telephone client provides a company list that contains information about companies such as company ID, company name, company short name, and company type. In some embodiments of the present invention, a user can edit company information or remove company from the list. In some embodiments of the present invention, a user can filter 10, 25, 50, and/or 100 records per list, but is not limited to. In some embodiments of the present invention, the inventive soft telephone client allows a user to search specific company based on entering at least one keyword.

In some embodiments, the inventive computer system and soft telephone clients of the present to allow a user to perform the following, but not limited to: access a call recording report, listen individual recording(s), electronically import/export/share record(s).

In some embodiments, the inventive computer system can provide a cross-platform functionality, allowing using the inventive soft telephone client across various computing devices (e.g., PCs, smartphones, tablets, etc.) but utilizing a single user account. In some embodiments, each user can set-up a personalized profile having the user's personal information (e.g., name, company, phone #, etc.); and the "device" setup. In some embodiments of the present invention, each user can only need a single device, which will work across multiple PCs. In some embodiments of the present invention, the user is allowed, utilizing the specifically programmed soft telephone client, to enter the user's device information device, name, password, type, etc.) for each device.

In some embodiments of the present invention, an administrator-user, utilizing, for example, the Dashboard functionality, can edit, suspend, and/or remove a user, and/or assign a role (e.g., broker, trader, compliance, administrator) to the user. In some embodiments, the inventive systems of the instant invention then utilized the role data to restrict/allow users to perform certain activities with the inventive soft telephone client(s) and/or the inventive computer system(s).

In some embodiments of the present invention, the inventive soft telephone client(s) and/or the inventive computer system(s) are specifically programmed to display relationships) between the users (e.g., the relationship between a user A and a user B). In some embodiments of the present invention, the inventive computer system(s) can assign a numeric value to a particular relationship type; and utilize numeric values to rank, classify, and/or organize users and their data (e.g., profiles) within networked, distributed databases that process and store such information.

In some embodiments, the illustrative Trader Voice Box can be a Java-based VoIP software designed for voice chat. In some embodiments, as shown in FIG. 5 and detailed above, the inventive systems of the present invention can offer one or more of the following features, but are not limited to: SIP-based architecture integrating with industry standard SIP-enabled PBX's, reduced back room, multi-party line sharing, full-duplex conferencing, up to eight speaker channels per module, support for private lines (ARD/MRD), supports hoot n' holler circuits, line monitor and talkback, intelligent pagination, optional voice recording, comprehensive set of embedded security features, and/or device management via an integral HTTP server or speakerbus' browser-based centralized management system, utilizing real time protocol (SbRTP) packet technology.

In some embodiments, the inventive soft telephone client(s) and/or the inventive computer system(s) of the present invention are programmed to access converged networks which allows to improved customer service and increased employee productivity without sacrificing quality and usability. For example, in some embodiments, the inventive soil telephone client(s) and/or the inventive computer system(s) of the present invention are programmed to have a channel capacity of, but not limited to and/or restricted to: 10 simultaneous call types (telephony, ARD, MRD, and hoot n' holler), 8 speaker channels (all call types), and/or 6 party conferences (no additional conference equipment required). In some embodiments of the present invention, call types can include at least one of any of the following features: telephony, hoot n' holler, and/or private line—ARD (private line automatic ring down) or MRD (manual ring down), In some embodiments of the present invention, input and output devices can include at least one of any of the following features, but is not limited to: 1× gooseneck microphone (noise canceling), 2× handsets momentary latching (noise canceling), 1× hands-free full duplex microphone, and/or 1× speaker with up to 8 mixed channels.

In some embodiments of the present invention, the inventive soft telephone client(s)' features can include at least one of any of the following features, but are not limited to: Avaya communications manager enterprise class features, intelligent pagination with 100 pages with up to 64 entries (max 600 entries) per page, 30 dedicated fixed function/hard keys, 24 soil keys (including up to 8× speaker channels), 8 independent channel volume controls (1 per speaker channel), master volume control, support for barge-in and privacy on private lines and telephony, support for programmable paginating and non-paginating keys, style based visual architecture, 32 alert profiles, multiple speaker muting options, private directory with up to 600 entries, line labeling up to 40 characters, single and double line styling, 16 programmable color styles, and/or inbound caller ID matching and display.

In some embodiments of the present invention, recording features can include at least one of any of the following features, but is not limited to: 3 configurable IP recording streams (per iD808), and/or call detailed record (per iD808).

In some embodiments of the present invention, network requirement features can include at least one of any of the following features, but are not limited to: network 100 base-tx (full duplex), IP addressing: dynamic or static, DNA support: Microsoft dynamic domain name system, voice LAN: multicast network utilizing and supporting SbRTP, voice WAN: unicast network supporting UDP, and/or other supported network protocols: Ethernet, IPv4, DHCP, TCP/IP, DNS & SNMP, In some embodiments of the present invention, signaling features can include at least one of any of the following features, but are not limited to: SIP (RFC 3261) SIP extensions of Avaya; audio compression on the WAN: G.711 PCM 3.4 KHZ A-law/U-law, G.722 (48K), G.729 Annex A-CS-ACELP; transmission protocol on LAN: speakerbus real time protocol (SbRTP) enhanced-7 KHZ voice bandwidth (adjustable packet sizes 1 ms, 2 ms, and 4 ms); bandwidth utilization per LAN stream (not including Ethernet pre-amble) between 416K/bits to 836K/bits (dependent upon packet size configuration—when voice activity detection is enabled); typical latency over LAN 6 ms (using 1 ms packet sizes); max packet loss 5-7%; and/or bandwidth utilization per WAN stream between 18K/bits to 96K/bits (dependent upon packet size and voice compression configuration.

In some embodiments, the inventive systems/methods of the present invention utilizes quality of service (QoS) functionality that can include at least one of any of the following features, but are not limited to: bandwidth optimization techniques: VAD (Voice Activity Detection); and/or diffsery (RFC 2474) type of service field configurable.

In some embodiments, the inventive soft telephone client(s) and/or the inventive computer system(s) of the present invention are programmed to offer at least one of any of the following features, but are not limited to: browser based centralized management application, embedded user configurable menus, simple network management protocol (SNMP) traps, supporting, for example, cold start, linkdown, linkup and authentication failure, and/or upgradeable operating firmware.

In some embodiments of the present invention, voice characteristics of audio devices can include at least one of any of the following features: voice frequency range 50 Hz-7 KHz, microphone sensitivity 63+/— or 3 dB, and/or loudspeaker output 2 W RMS.

Figure 19:
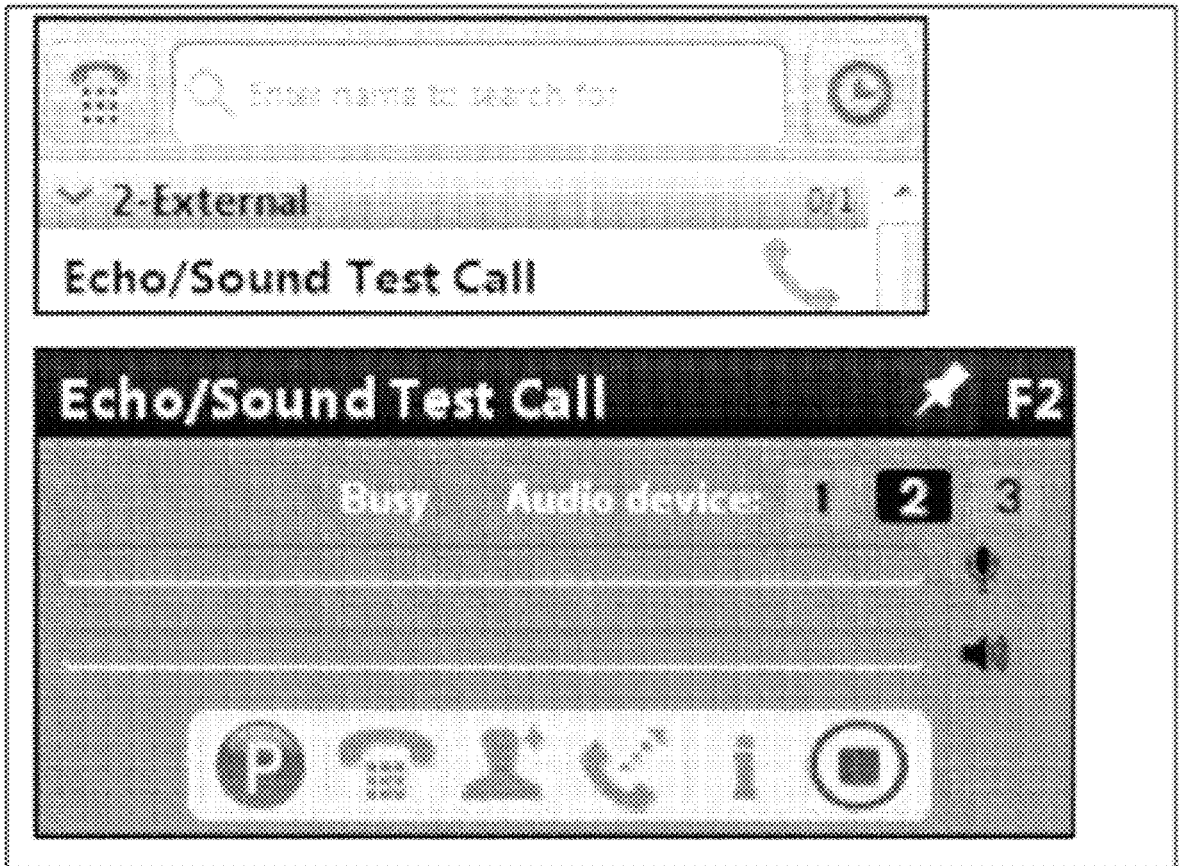

In some embodiments, the inventive soft telephone client(s) of the present invention can function on computing devices that include at least one of the following, but is not limited to: 2× switched network interface 10/100 BaseT Ethernet auto sensing ports (RJ45 sockets), 2× handset interface ports (RJ11 sockets), lx USB 2.0 interface Type A (host), lx USB 2.0 interface type B (peripheral), 8 Pin mini din com port (reserved for use by speakerbus), and/or 2.5 mm DC outlet socket.

in some embodiments, the inventive soft telephone client(s) of the present invention can be programmed to utilize at least one audio device option. In some embodiments, the inventive soft telephone client(s) of the present invention can be programmed to utilize up to at least three different hardware devices for a user's connections. In some embodiments, the inventive soft telephone client(s) of the present invention can be programmed to utilize up to at least four different hardware devices for a user's connections. In some embodiments, the inventive soft telephone client(s) of the present invention can be programmed to utilize up to at least five different hardware devices for a user's connections. In some embodiments, the inventive soft telephone client(s) of the present invention can be programmed to utilize up to at least six different hardware devices for a user's connections. In some embodiments, the inventive soft telephone client(s) of the present invention can be programmed to utilize up to at least seven different hardware devices for a user's connections. In some embodiments, the inventive soft telephone client(s) of the present invention can be programmed to utilize up to at least eight different hardware devices for a user's connections. In some embodiments, the inventive soft telephone client(s) of the present can be programmed to utilize up to at least nine different hardware devices for a user's connections. In some embodiments, the inventive soft telephone client(s) of the present invention can be programmed to utilize up to at least ten different hardware devices for a user's connections. In some embodiments, the inventive soft telephone client(s) of the present invention can be programmed to utilize up to at least twenty different hardware devices for a user's connections. In some embodiments, the inventive soft telephone client(s) of the present invention can be programmed to allow use of multiple (e.g., at least two, at least three, at least four, at least five, at least six, at least seven, at least eight, at least nine, at least ten, at least twenty, etc.) audio devices concurrently.

in some embodiments, as shown in FIGS. 19, the inventive specifically programmed soft telephone client of the present invention provides a functionality to test the audio setup and if hardware is successfully connected. In some embodiments, the test call is configured not to ring. In some embodiments, the test call can show the user a message confirming connection. In an embodiment, the user can speak while a test call has been activated and the test call will echo the user's speech.

In some embodiments, each audio device can be selected for use for internal and/or external connections. In some embodiments, the inventive specifically programmed soft telephone client of the present invention is configured to allow a user to make internal and/or external connections (i.e., calls). In some embodiments, an internal contact is a second user of the present invention and resides on the same network as the first user the first and the second users are employees of the same company). In some embodiments, an external contact is a second user that does not reside on the same network as the first user (e.g., the first and the second users are employees of different companies). In some embodiments, at least one external and/or internal contact uses a regular telephone or a hardware turret. In some embodiments, at least one external and/or internal contact uses the inventive specifically programmed soft telephone client of the present invention.

Figure 18A:
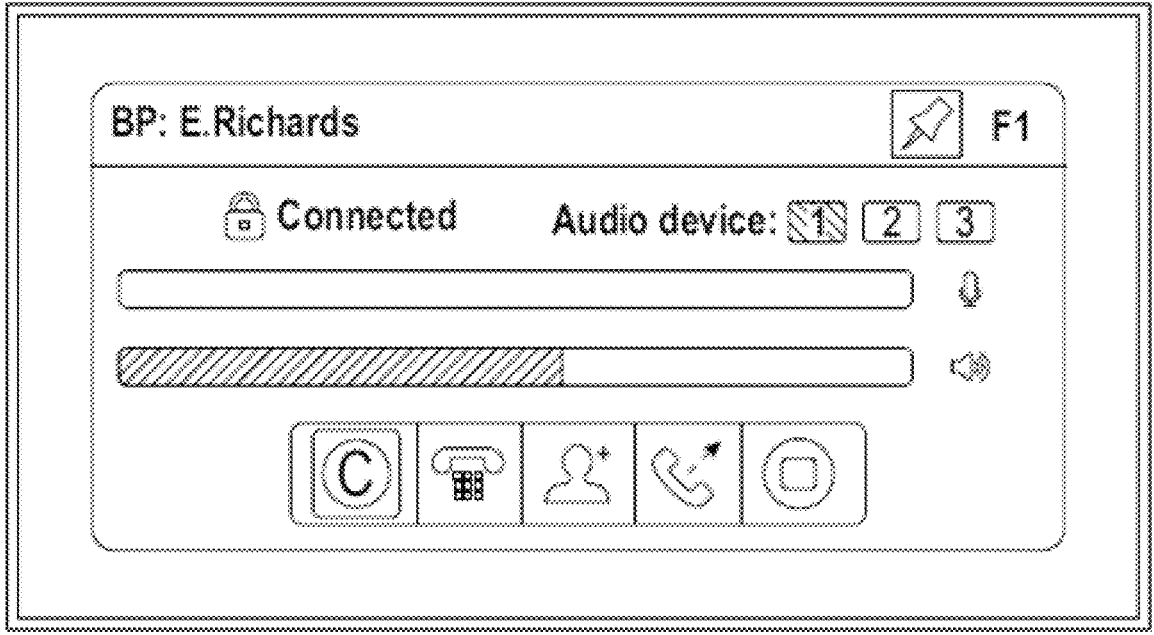
Figure 18B:
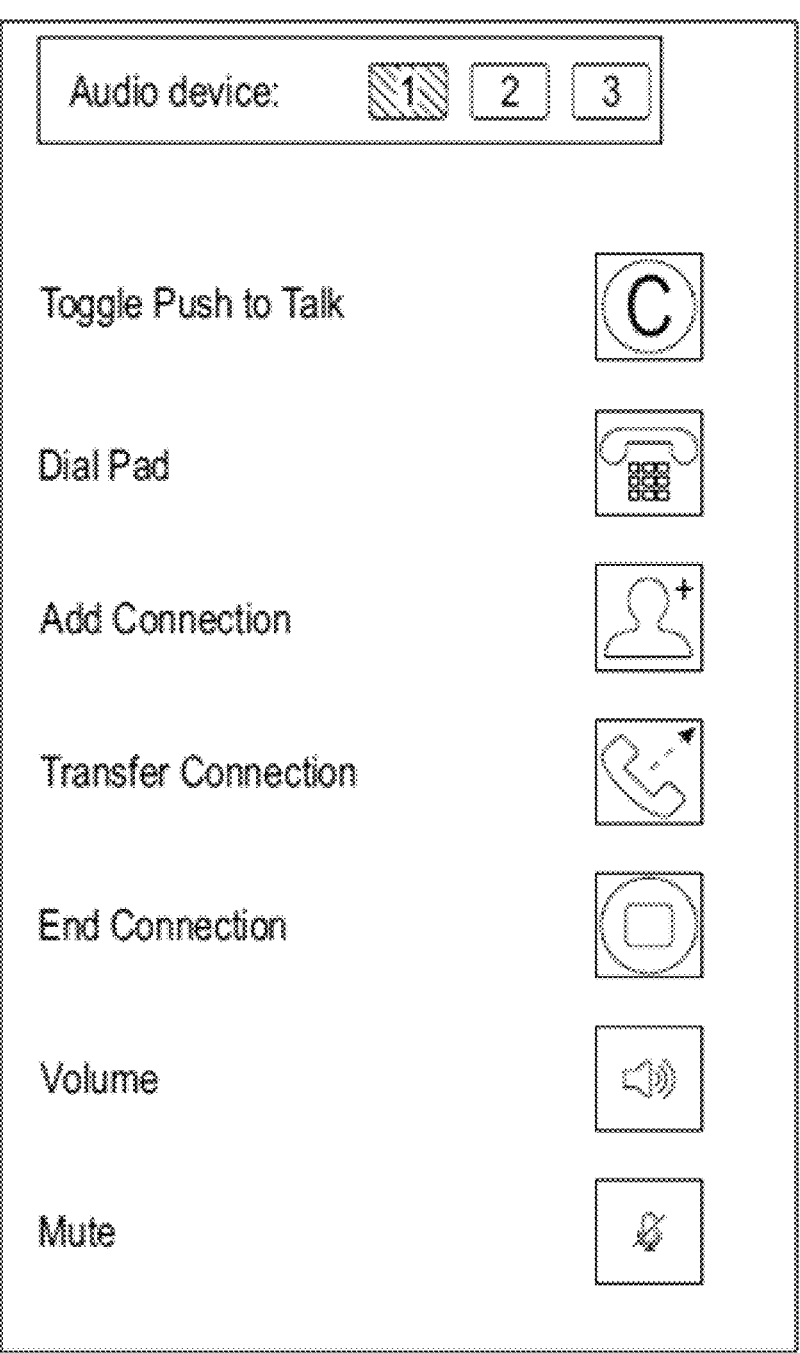

As shown in FIG. 18B, a user selects one out of three buttons having 1-3 numbers to select a particular audio device to perform at least one of the seven identified activities such as (I) initiating numerous internal and/or external connections at the same time, utilizing, for example, a list of user's contacts (e.g., a second connection, a third connection, a fourth connection, a fifth connection, a sixth connection, a seventh connection, an eighth connection, a ninth connection, a tenth connection, a twentieth connection, etc.); (2) designating a device to answer and/or decline calls; (3) merging or unmerging/removing simultaneous internal and/or external connections (e.g., at least two connections, at least three connections, at least four connections, at least five connections, at least six connections, at least seven connections, at least eight connections, at least nine connections, at least ten connections, at least twenty connections, etc.); (4) maintaining a first can/connection separately but concurrently with at least a second connection/call; (5) mute/unmute sound, (6) pin at least one call window to a user's desktop, or any combination thereof.

Figure 20:
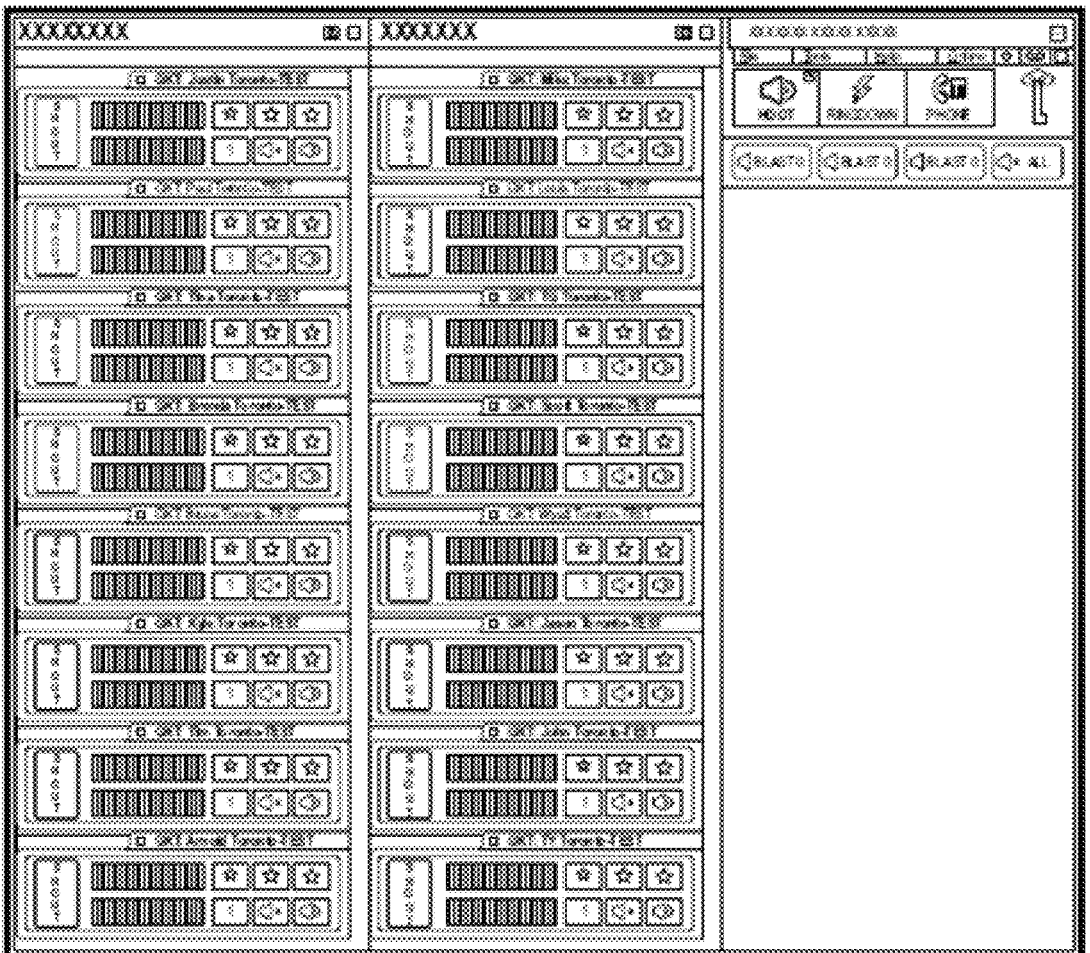

In some embodiments, as shown in FIG. 20, the present invention allows a user to group and/or merge at least two connections. In some embodiments, the present invention allows a user to group and/or merge at least three connections. In some embodiments, the present invention allows a user to group and/or merge at least four connections. In some embodiments, the present invention allows a user to group and/or merge at least five connections. In some embodiments, the present invention allows a user to group and/or merge at least six connections. In some embodiments, the present invention allows a user to group and/or merge at least seven connections. In some embodiments, the present invention allows a user to group and/or merge at least eight connections. In some embodiments, the present invention alto vs a user to group and/or merge at least nine connections. In some embodiments, the present invention allows a user to group and/or merge at least ten connections. In some embodiments, the present invention allows a user to group and/or merge at least twenty connections. In some embodiment, a user can mute or unmute sound by using a pre-programmed icon.

In some embodiments, the inventive soft telephone client of the present invention is configured to automatically answer at least one connection/call. In some embodiments, the inventive soft telephone client of the present invention is configured to automatically answer at least two connections/calls. In some embodiments, the inventive soil: telephone client of the present invention is configured to automatically answer at least three connections/calls. In some embodiments, the inventive soft telephone client of the present invention is configured to automatically answer at least four connections/calls. In some embodiments, the inventive soft telephone client of the present invention is configured to automatically answer at least five connections/calls. In some embodiments, the inventive soft telephone client of the present invention is configured to automatically answer at least six connections/calls. In some embodiments, the inventive soft telephone client of the present invention is configured to automatically answer at least seven connections/calls. In some embodiments, the inventive soil telephone client of the present invention is configured to automatically answer at least eight connections/calls. In some embodiments, the inventive soft telephone client of the present invention is configured to automatically answer at least nine connections/calls. In some embodiments, the inventive soft telephone client of the present invention is configured to automatically answer at least ten connections/calls. In some embodiments, the inventive soft telephone client of the present invention is configured to automatically answer at least twenty connections/calls.

In some embodiments, the inventive soft telephone client of the present invention is configured to permit a user to hide at least one offline and/or external contact. In some embodiments, the inventive soft telephone client of the present invention is configured to permit a user to hide at least two offline and/or external contacts. In some embodiments, the inventive soft telephone client of the present invention is configured to permit a user to hide at least three offline and/or external contacts. In some embodiments, the inventive soft telephone client of the present invention is configured to permit a user to hide at least four offline and/or external contacts. In some embodiments, the inventive soft telephone client of the present invention is configured to permit a user to hide at least five offline and/or external contacts. In some embodiments, the inventive soft telephone client of the present invention is configured to permit a user to hide at least six offline and/or external contacts. In some embodiments, the inventive soft telephone client of the present invention is configured to permit a user to hide at least seven offline and/or external contacts. In some embodiments, the inventive soft telephone client of the present invention is configured to permit a user to hide at least eight offline and/or external contacts. In some embodiments, the inventive soft telephone client of the present invention is configured to permit a user to hide at least nine offline and/or external contacts. In some embodiments, the inventive soft telephone client of the present invention is configured to permit a user to hide at least ten offline and/or external contacts. In some embodiments, the inventive soft telephone client of the present invention is configured to permit a user to hide at least twenty offline and/or external contacts.

Figure 21:
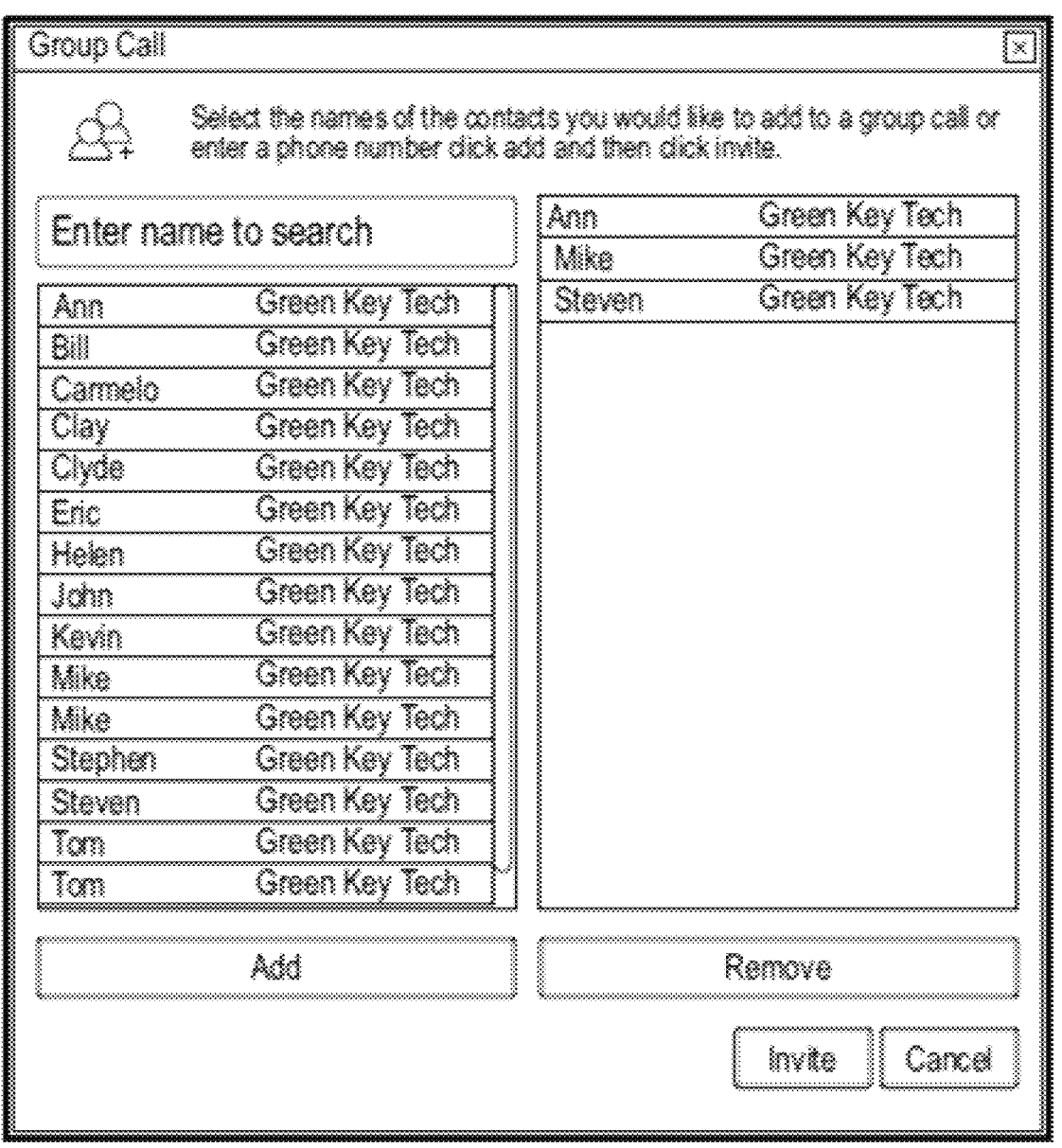

In an embodiment, as shown in FIG. 21, the inventive soft telephone client of the present invention is configured to allow a user to add and/or remove one or more 2, 3, 7, 10, 20, etc.) internal and/or external contacts when initiating a group call/connection(s).

Figure 22:
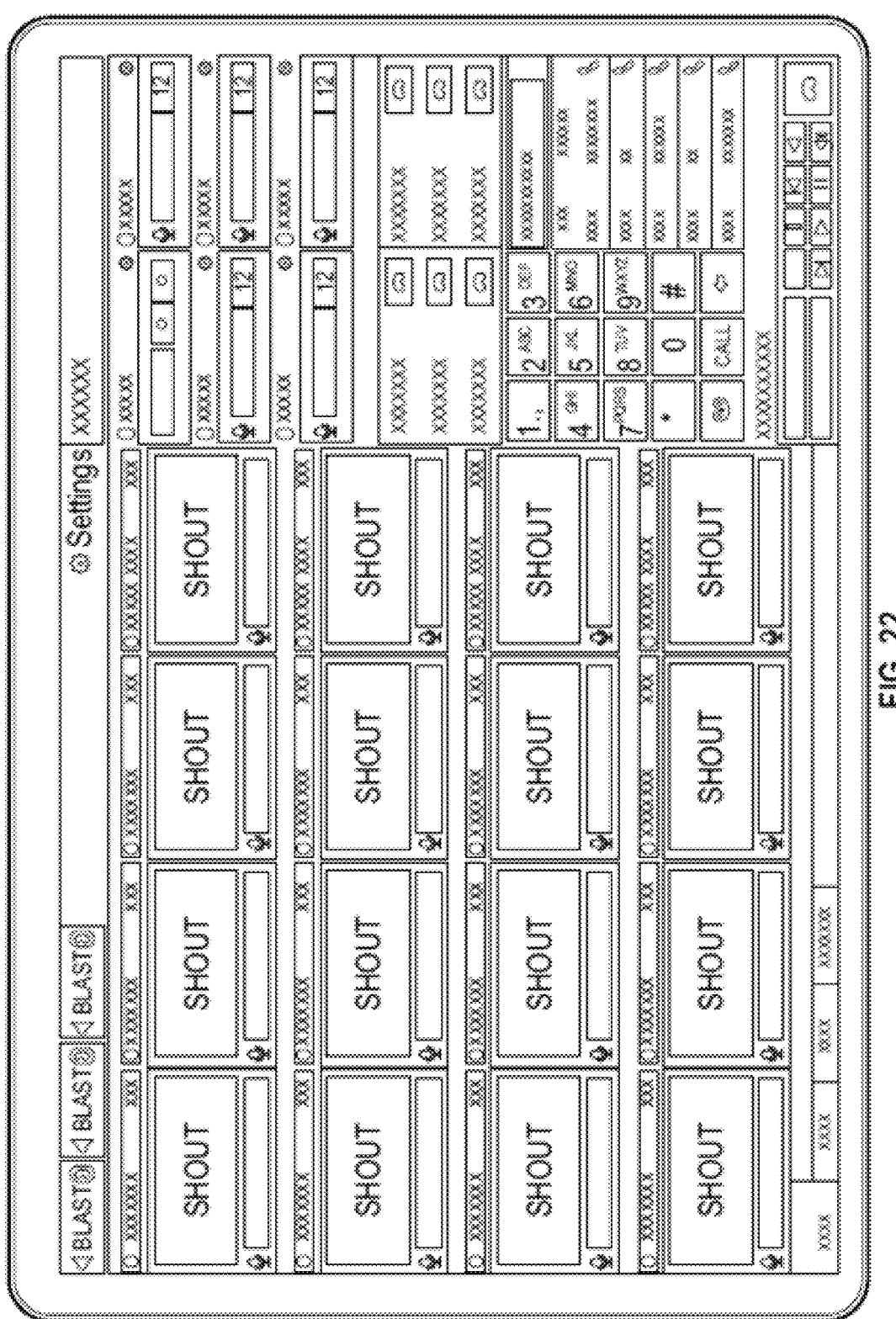

As shown in FIG. 22, in some embodiments, the inventive soft telephone client of the present invention is configured to allow a user to pin active call(s)/connection(s) to (e. at least one, at least two, at least three, at least four, at least five, at least six, at least seven, at least eight, at least nine, at least ten, at least twenty, etc.) specific area on the user's desktop. In some embodiments, the pinned call(s)/connection(s) (e.g., at least one, at least two, at least three, at least four, at least five, at least six, at least seven, at least eight, at least nine, at least ten, at least twenty, etc.) is/are configured to appear at the same location on the user's desktop. In some embodiments, the inventive soft telephone client of the present invention is configured to permit a user o pin the call(s)/connection(s) window to the desktop, wherein the call(s)/connection(s) window is active, inactive group call(s)/connection(s), and/or a single call/connection. In some embodiments of the present invention, once a call(s)/connection(s) window is pinned, an icon (e.g., a push-pin) can be programmed to change color.

Figure 23B:
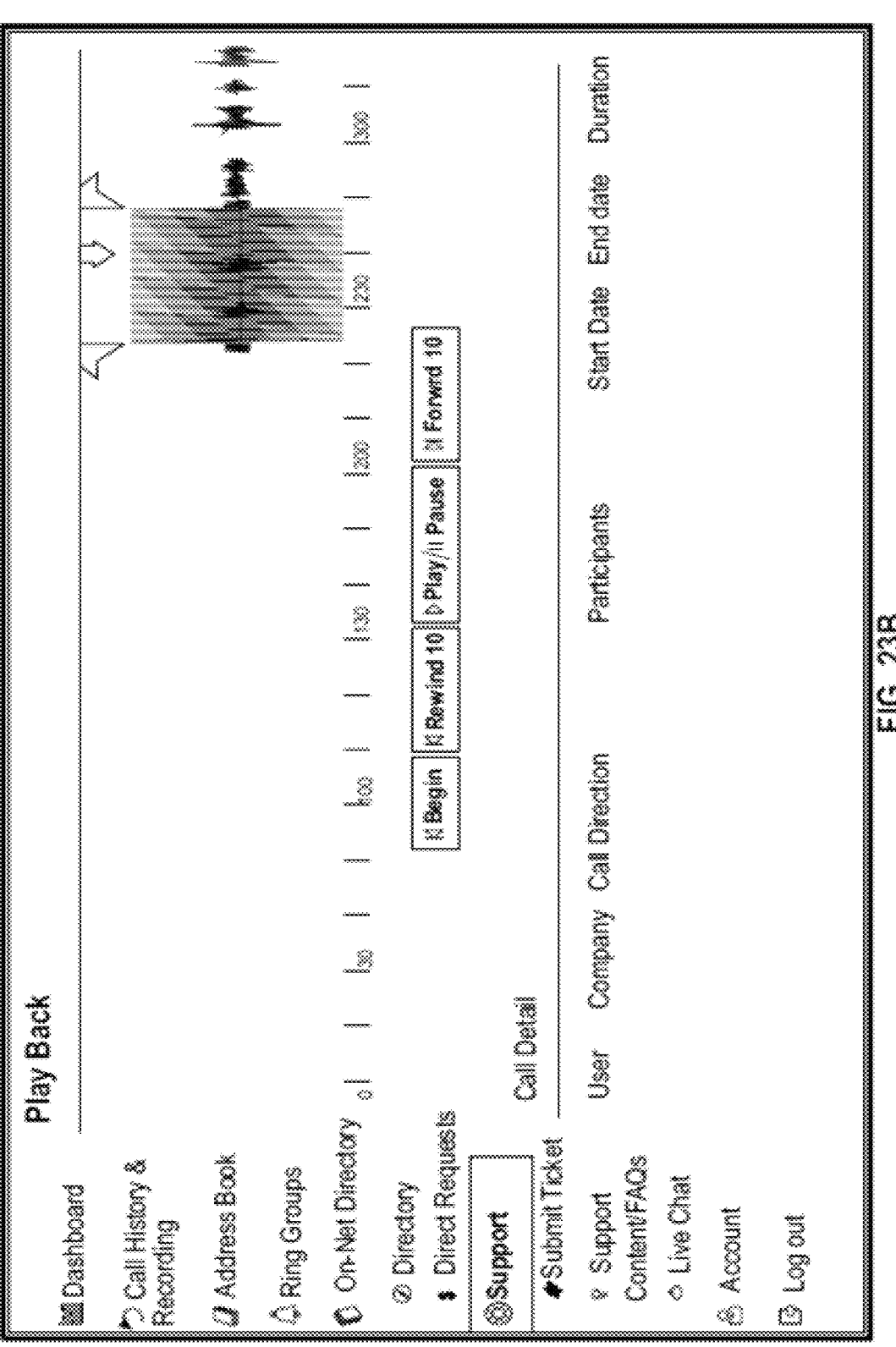

In some embodiments, as shown in FIGS. 23A-23B, the inventive computer systems and client(s) of the present invention are configured to record, track, store, display, associate/tag, electronically share, and real-time analyze call(s)/connection(s) recordings for purposes such as compliance with regulation(s) and/or law(s). In some embodiments, the inventive computer systems and client(s) of the present invention are programmed to allow call recording to be searched based on keywords and/or concepts.

In some embodiments, as shown in FIG. 21, the present invention is configured to permit a user to manage at least one group. In an embodiment, the present invention allows a user to add at least one contact list group. In an embodiment, the present invention allows a user to add at least two contact list groups. In an embodiment, the present invention allows a user to add at least three contact list groups. In an embodiment, the present invention allows a user to add at least four contact list groups. In an embodiment, the present invention allows a user to add at least five contact list groups. In an embodiment, the present invention allows a user to add at least six contact list groups. In an embodiment, the present invention allows a user to add at least seven contact list groups. In an embodiment, the present invention allows a user to add at least eight contact list groups. In an embodiment, the present invention allows a user to add at least nine contact list groups. In an embodiment, the present invention allows a user to add at least ten contact list groups. In an embodiment, the present invention allows a user to add at least twenty contact list groups.

In some embodiments, each contact list group can be made out of internal contact(s), external contact(s), or both.

Figure 24:
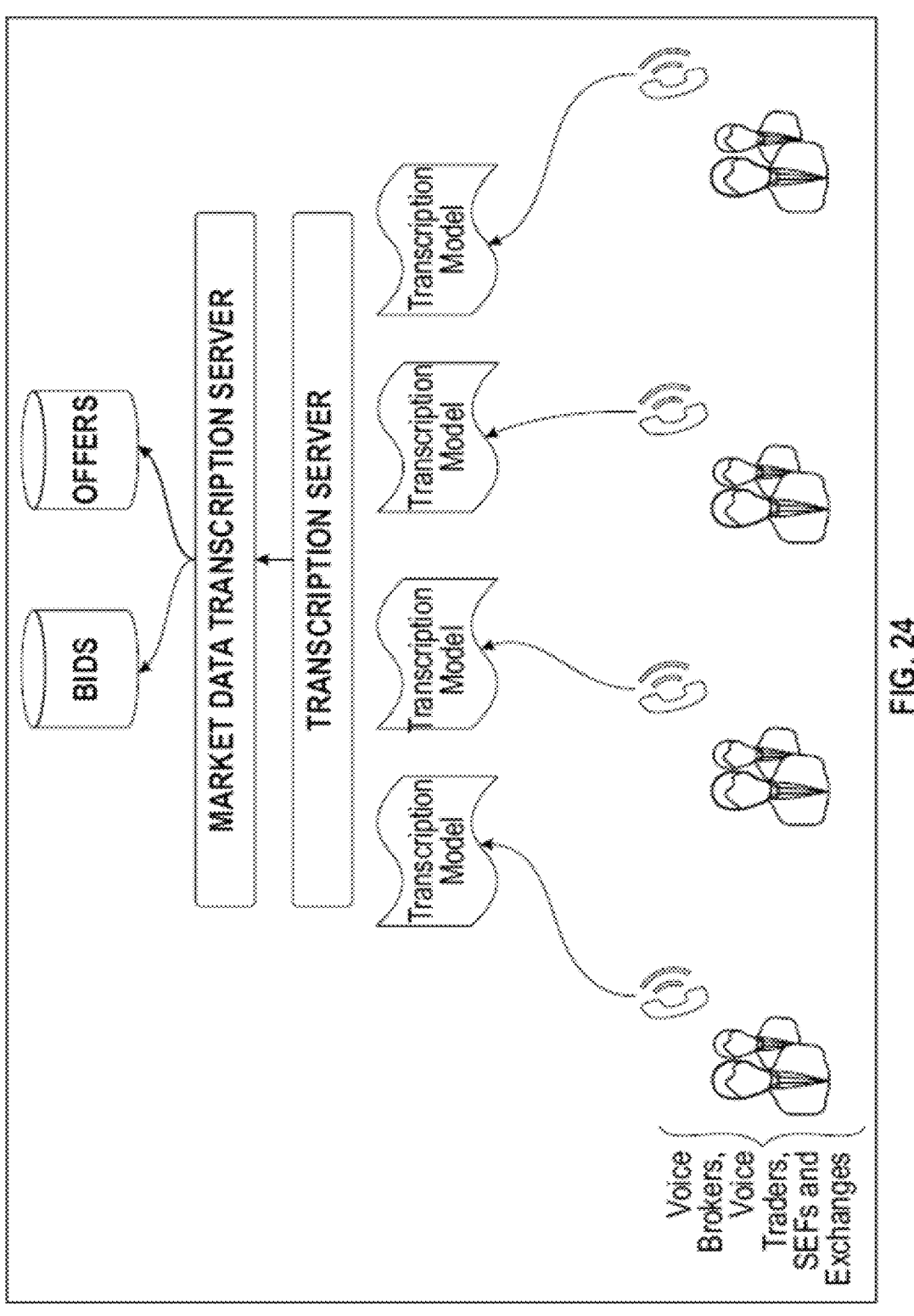

As shown in FIG. 24, in some embodiments, the inventive computer system(s) and/or the inventive soft telephone client(s) of the present invention are/is configured to periodically or continuously transcribe, in real time, voice communications taken place over the connections calls. In some embodiments, as shown in FIG. 24, in the financial trading environment, the inventive computer system(s) and/or the inventive soft telephone client(s) of the present invention can be programmed to identify/data mine based, at least in part, on certain financial terms which may occur in the recording speech or in real-time-fed speech. For example, the inventive computer system(s) and/or the inventive soft telephone client(s) of the present invention can be programmed to identify when "bid" and/or "offer" are spoken by traders and at least one of: (1) separately record both sets of values in a database for future compliance and/or performance analysis (e.g., identify the best bid(s) and/or offer(s)); and/or (2) perform real-time compliance enforcement and/or productivity feedback as the recording(s) being recorded.

FIGS. 25A-25D are exemplary diagrams which illustrate graphical user interfaces having various functionalities of the inventive soft telephone client(s) in accordance with some embodiments of the present invention. For example, regarding FIG. 25A, item 2501 is a Menu bar; item 2502 is a programmed button for call forwarding; item 2503 is a programmed "Listen To Recordings" button which takes a user to a call recording screen/portal; item 2504 is a programmed "Voicemail Indicator & Missed Call" button; items 2505 are programmed detachable tabs (Phone, History, Directs, Chat); item 2506 is a programmed button to collapse/minimize a dial pad box, item 2507 is a programmed box for entering/displaying phone numbers and search values; item 2508 is a programmed button to launch a window/portal for adding contact(s); item 2509 is a programmed box for real-time search through address book; item 2510 is a programmed button to access call voicemail; items 2511 are programmed tabs per each participant of a call; items 2511 are six fixed programmed call panels/boxes which are open, disconnected as a PBX call is made, next available call box becomes active connection (call boxes are static and contained within the inventive soft telephone client); item 2513 is a programmed button launching a window/portal for adding and/or editing an address book; item 2514 is a programmed box showing contacts in the address book; and item 2515 is a programmed scrolling through the address book's entries.

For example, FIG. 25B shows an exemplary panel for viewing call history, displaying outbound, inbound, and missed calls; each programmed "Icon" button allows to redial the corresponding number. In some embodiments, calls can also be place by clicking on a phone number itself.

Figure 25A:
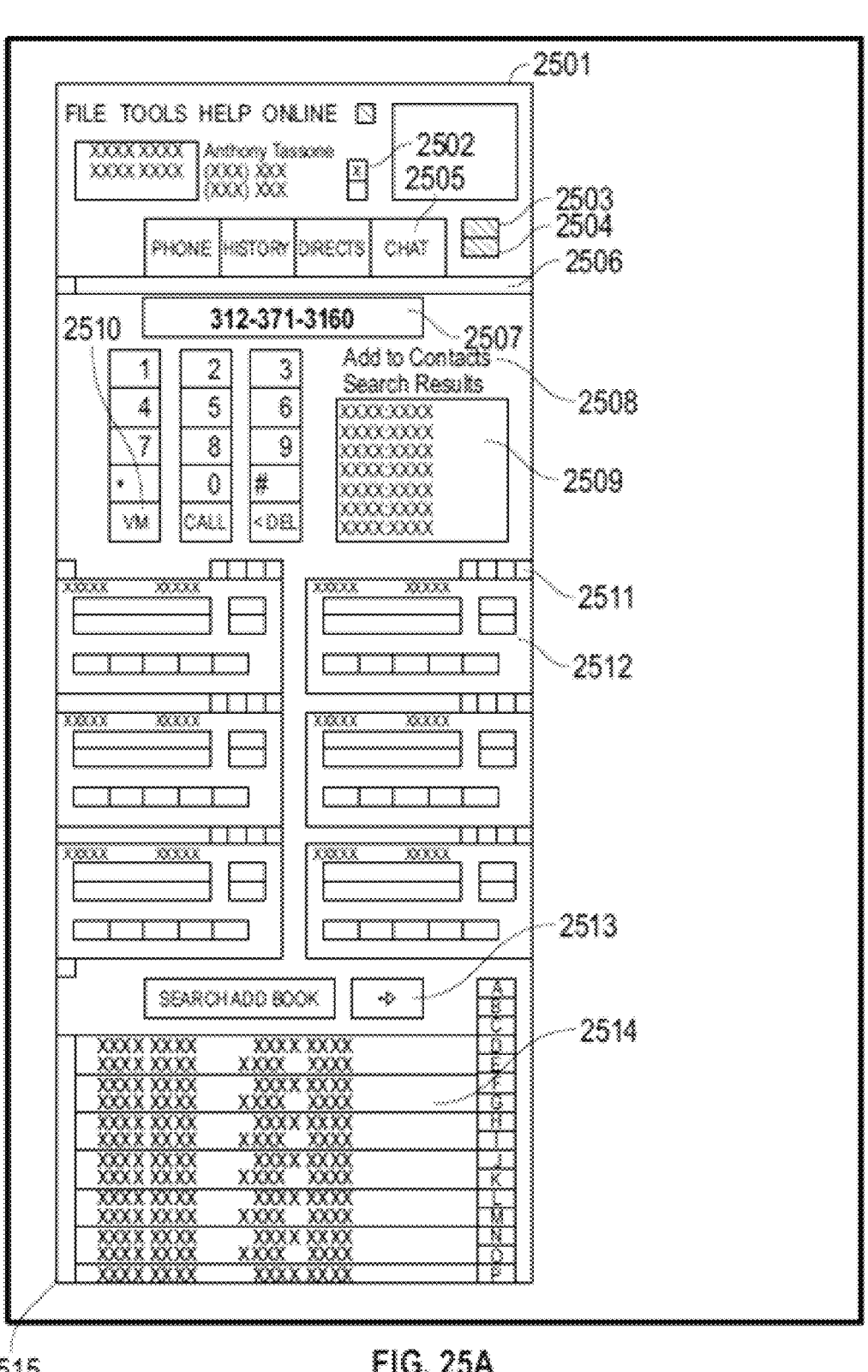
Figure 25B:
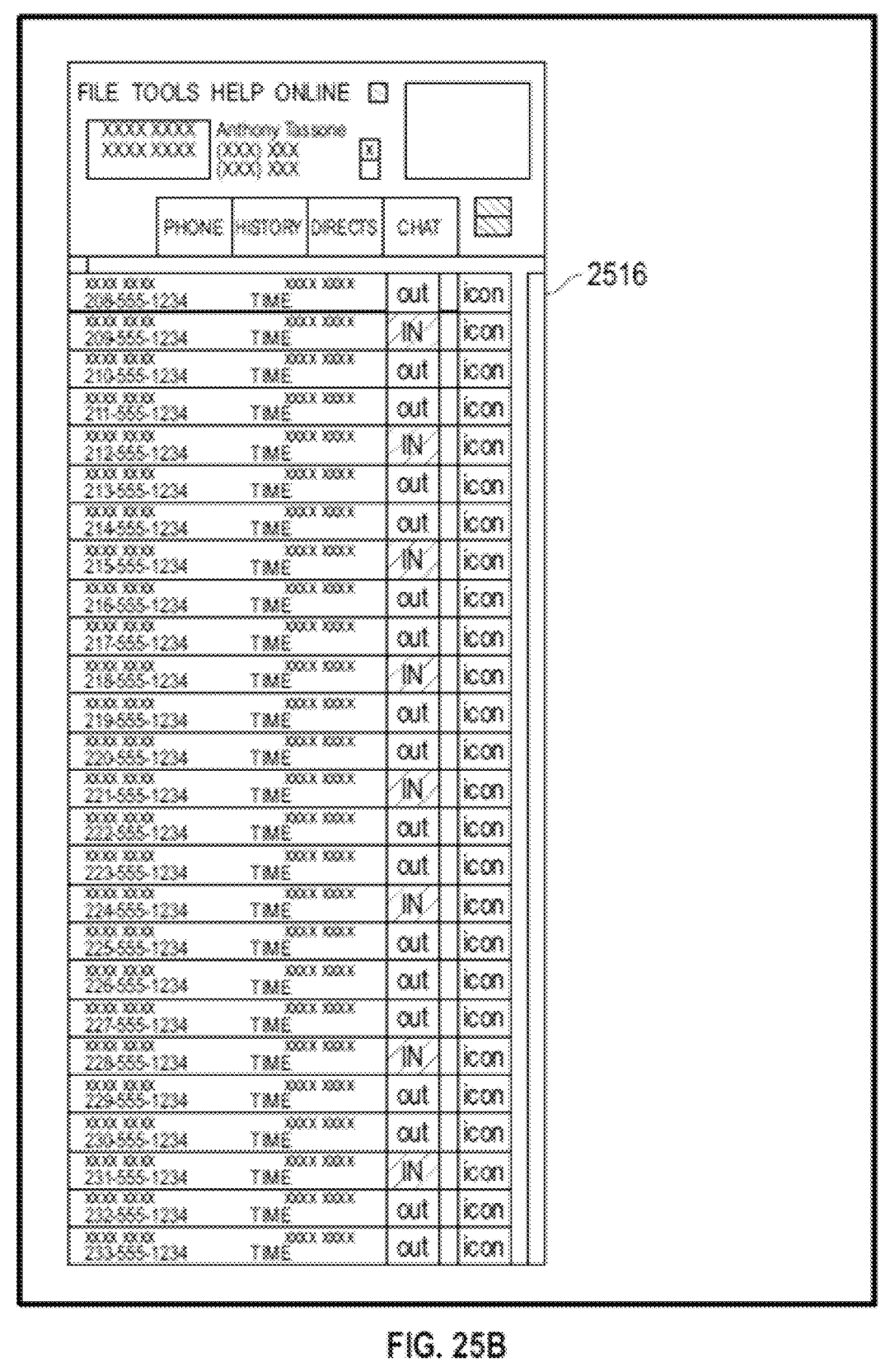
Figure 25C:
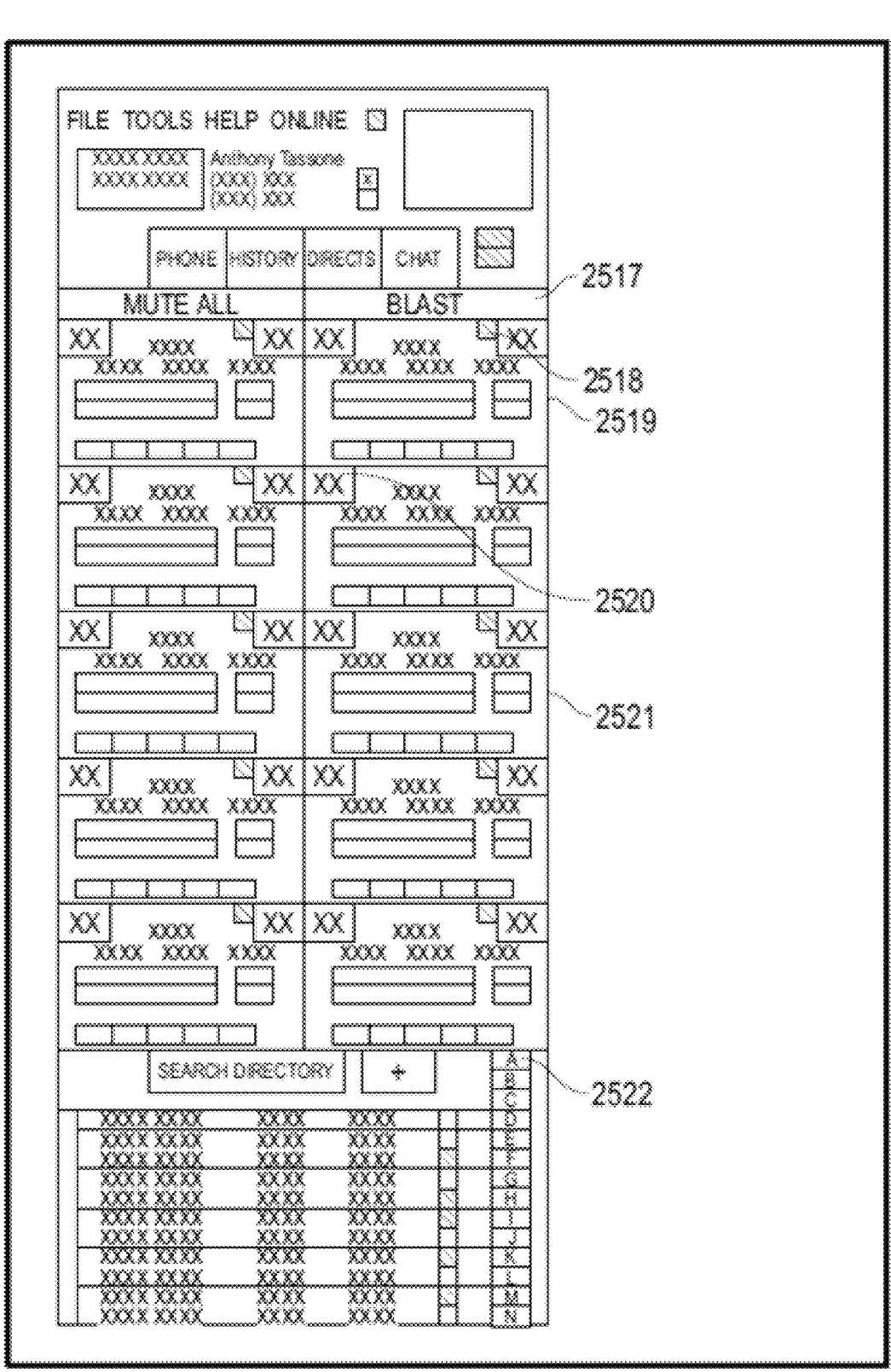

For example, regarding FIG. 25C, item 2517 is a programmed "Blast" button for blasting those in active "Blast Group" (e.g., broadcasting a message, speaking to all at the same time); item 2518 is a programmed button launching a window/portal for include in a Blast Group; items 2519 are ten fixed programmed Shout downs" call panels/boxes contained within the client; item 2520 is a placeholder for an image such as, but not limited to, a company's logo, user's avatar/picture; item 2521 is a programmed workspace of the inventive soft telephone client which can be saved; hotkeys can be pre-assigned; after user's login, the workspace can automatically connect to pre-selected contacts (e.g., last called contacts), including connecting to TDM turrets (if a user or Turret is unavailable, connection should reattempt every N minute until, for example, user clicks a "stop" button on the call box); and item 2522 is a programmed Search Directory which, for example, can contain every Company name that is on a network or any affiliated partner's network; connections to companies can be color coded such as a "green" connection can be double clicked and added to next available call box, and/or assigned to a particular hot key; a "red" boxes require the user to contact support so that a permission for the connection is given.

Figure 25D:
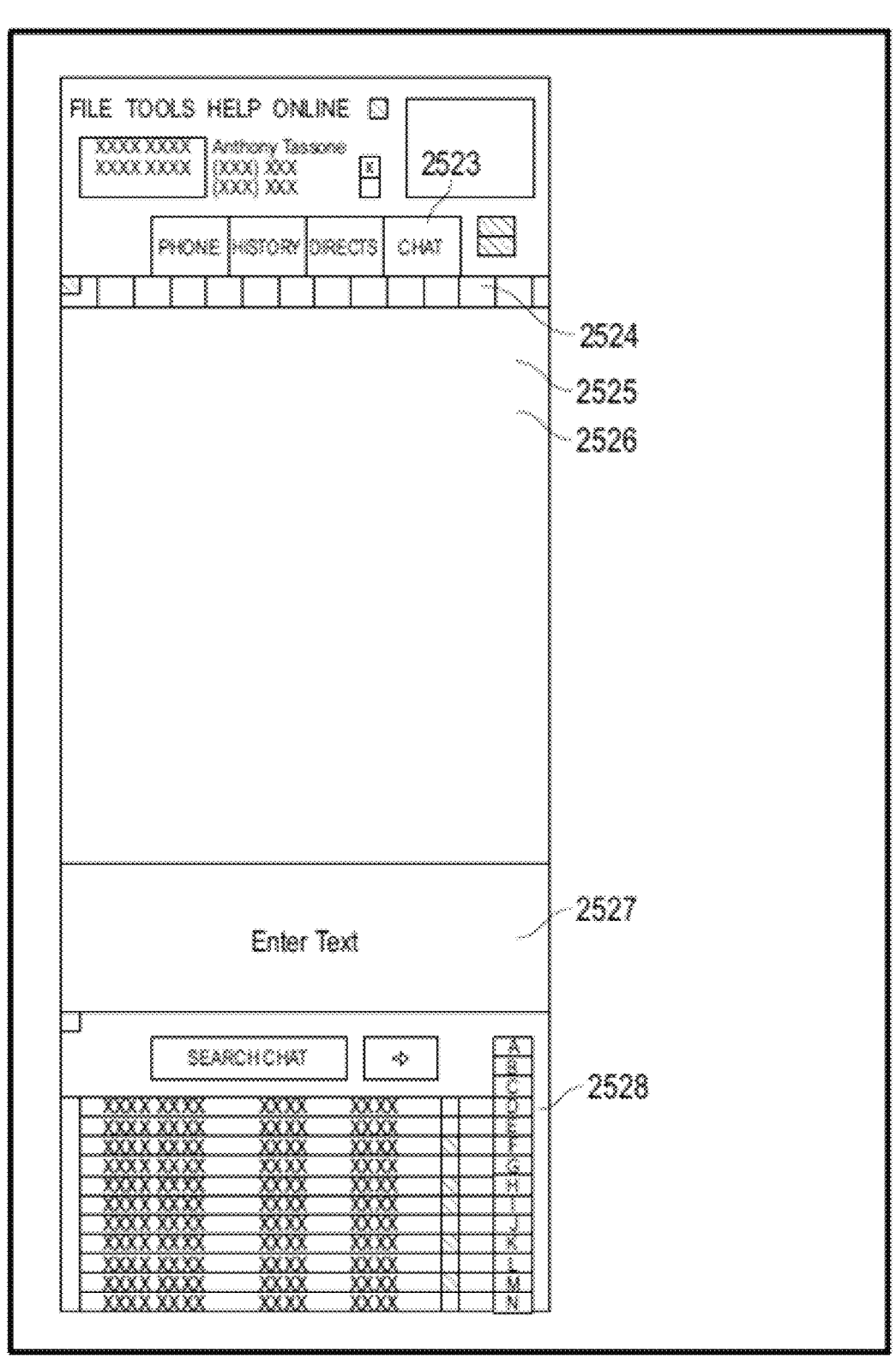

For example, regarding FIG. 25D, item 2523 is a programmed CHAT functionality (e.g., Yahoo, Aim, SIP, etc.). In some embodiments, each chat conversation has its own tab launched. Further, regarding FIG. 25D, items 2524 are CHAT tabs for each chat conversation; item 2525 is a programmed CHAT Screen that contain the parties involved and the conversation taking place; item 2526 is a placement of a timestamp for each chat conversation; item 2527 is a programmed CHAT box for entering chat text and symbols (e.g., emoticons); and item 2528 is a programmed CHAT contact list box.

In some embodiments, the inventive soft telephone clients and the inventive computer systems of the present invention are programmed for transcription of the entries in the chat window (2523). For example, a user can "hoot" another user via the inventive computer systems of the present invention and the transcribed text is sent as a chat message by the inventive soft telephone client of such user. In some embodiments, this functionality allows the users (e.g., traders) to be brought up to speed quickly on what they missed by reading the transcribed text messages when the users step away from their desk for a period of time. In some embodiments, chat messages are brief "hoots" of 5 to 30 seconds of voice. In some embodiments, the inventive soft telephone client of the present invention is programmed to allow the user to customize notifications based on keywords showing up in the chat window. For example if a user receives a transcribed hoot with the words "Bid", "Ask", "Trades," the user may customize his/her notifications to play a sound and/or flash yellow.

Figure 26:
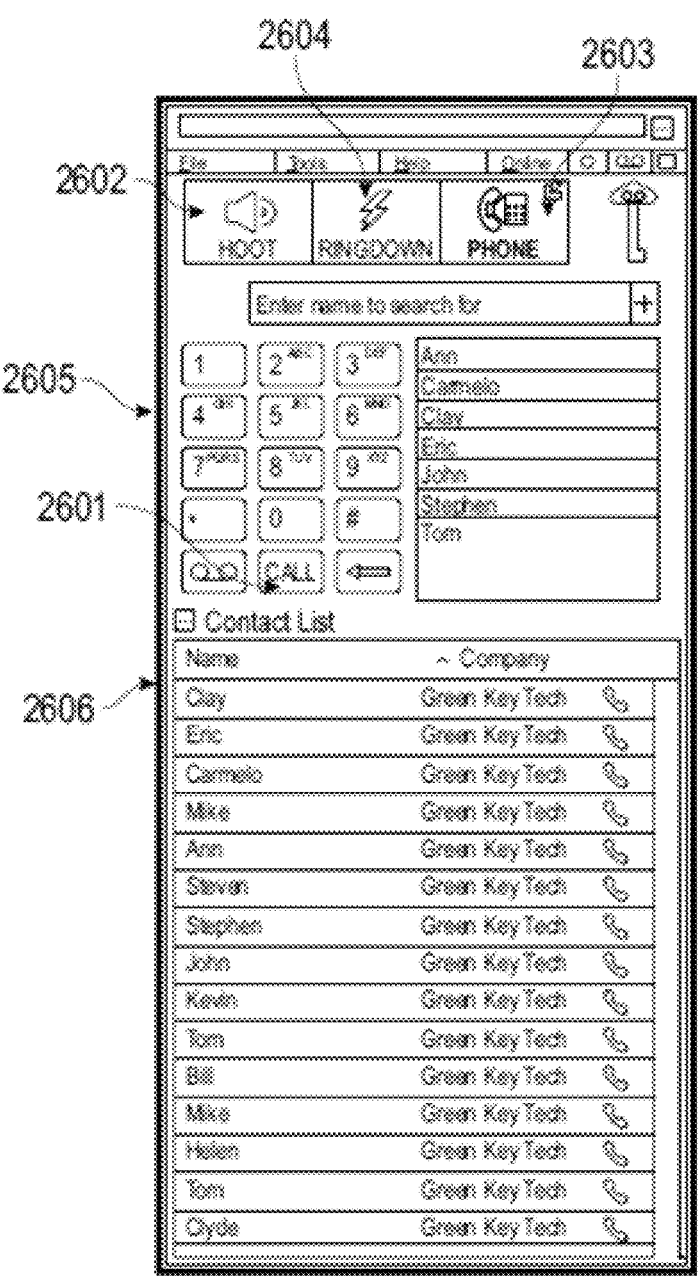
Figure 27:
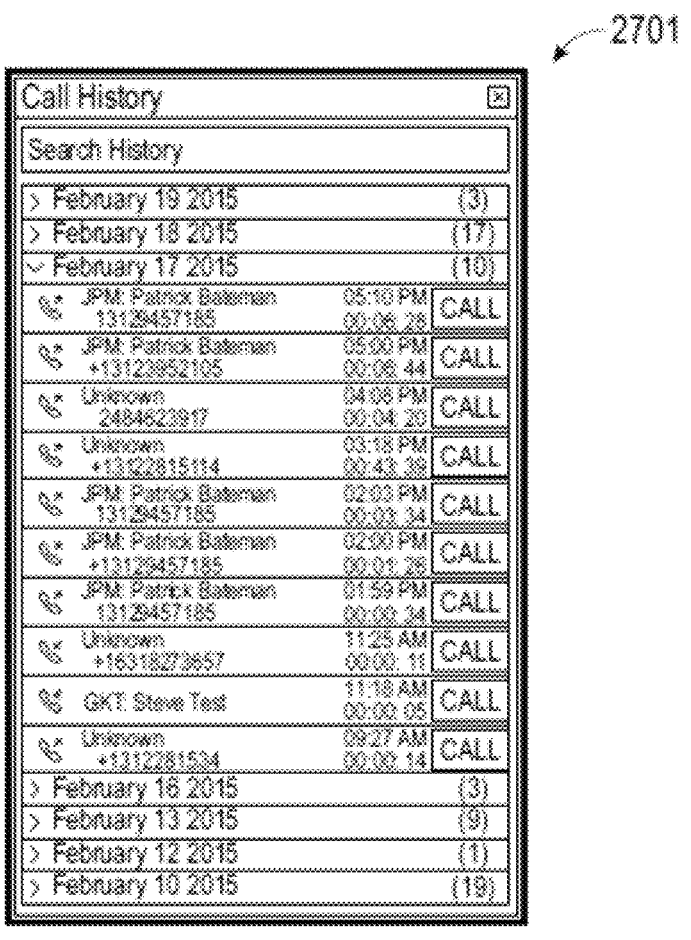

FIG. 26 shows a screenshot of another exemplary desktop of the inventive soft telephone client of the instant invention. For example, regarding exemplary desktop of FIG. 26, the user can access/launch a Call History window/portal (FIG. 27) by selecting a "Call History" option under a "File" dropdown. Menu option. In some embodiments, the call history of FIG. 27 includes date-headed segments detailing the call history. For example, the Search History field (2701) allows for filtering by call participant name or number. In some embodiments, the inventive soft telephone client of the instant invention is programmed to allow accessing the Call History from the File Menu or by clicking the "Call" icon (2601, to the right of the voice mail indicator) (FIG. 26). In some embodiments, by double-clicking on the row showing the call (FIG. 27) or clicking on a "CALL" button will initiate a new call and/or play the recording of the past call.

Referring to FIG. 26, items 2602-2604 are detachable tabs for selecting visual panels having particular functionalities of the inventive soft telephone client(s) and the inventive computer systems of the present invention.

Phone Tab (Item 2603)

Under the Phone Tab are two panels: Dial Pad (2605) and Contact List (2606). For example, a user can show/hide the contact list of these panels by clicking the – button on the left of the panel.

Dial Pad (2605)

The Search box lets the user to search for a contact. In some embodiments, the inventive soft telephone client of the present invention executes the search as the user types, with the results displayed in the area on the right. Clicking on a result highlights it; clicking "CALL" with the result highlighted initiates the call.

In some embodiments, the user's favorite contacts are displayed next to the dial pad. In some embodiments, the user needs to configure user favorites. In some embodiments, the user can type full phone numbers into the Search box or click buttons on the keypad. In some embodiments, the keypad arrow functions as a backspace and the Voice Mail key dials the user's voice mail number.

Contact List (2606)

In some embodiments, the Contact List (2606) displays contacts that the user added. By clicking on a contact name, the inventive soft telephone client of the present invention displays a list of numbers to dial. By clicking on the letter buttons to the right of the Contact List navigates to names starting with that letter.

Figure 28:
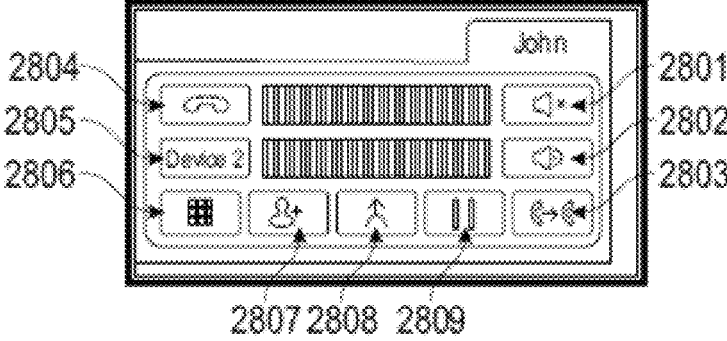

Active Call Window (FIG. 28)

FIG. 26 shows a screenshot of an exemplary active call window of the inventive soft telephone client in accordance with some embodiments of the present invention (a user can can have multiple connections at the same time, each with its own window):

Phone Icon (2804)—disconnects the call;
Mute Button (2801)—mutes the call;
Device Button (2805)—switches to a different device, if configured in the Options menu;
Dial pad (2806)—brings up a mini-dial pad for use in the call;
Invite (2807)—open the Group Call dialog window;
Merge Calls (2808)—when participating in multiple calls, click this to merge into a single call; in some embodiments, the user can be asked to "Merge All Calls with This" or "Merge Selected Calls" with this; the "Merge Selected Calls" will bring up a dialog window showing active calls that can be merged (after starting a group call, the user can disconnect individual participants by right-clicking their name and selecting "Remove");
Hold (2809)—pause connection, playing music to the other participants; and
Transfer (2803)—detach from the call, transferring control to a third party (e.g., a dialog window is displayed with a clickable list of the user's contacts with a search box to enter non-contact numbers).

Figure 29:
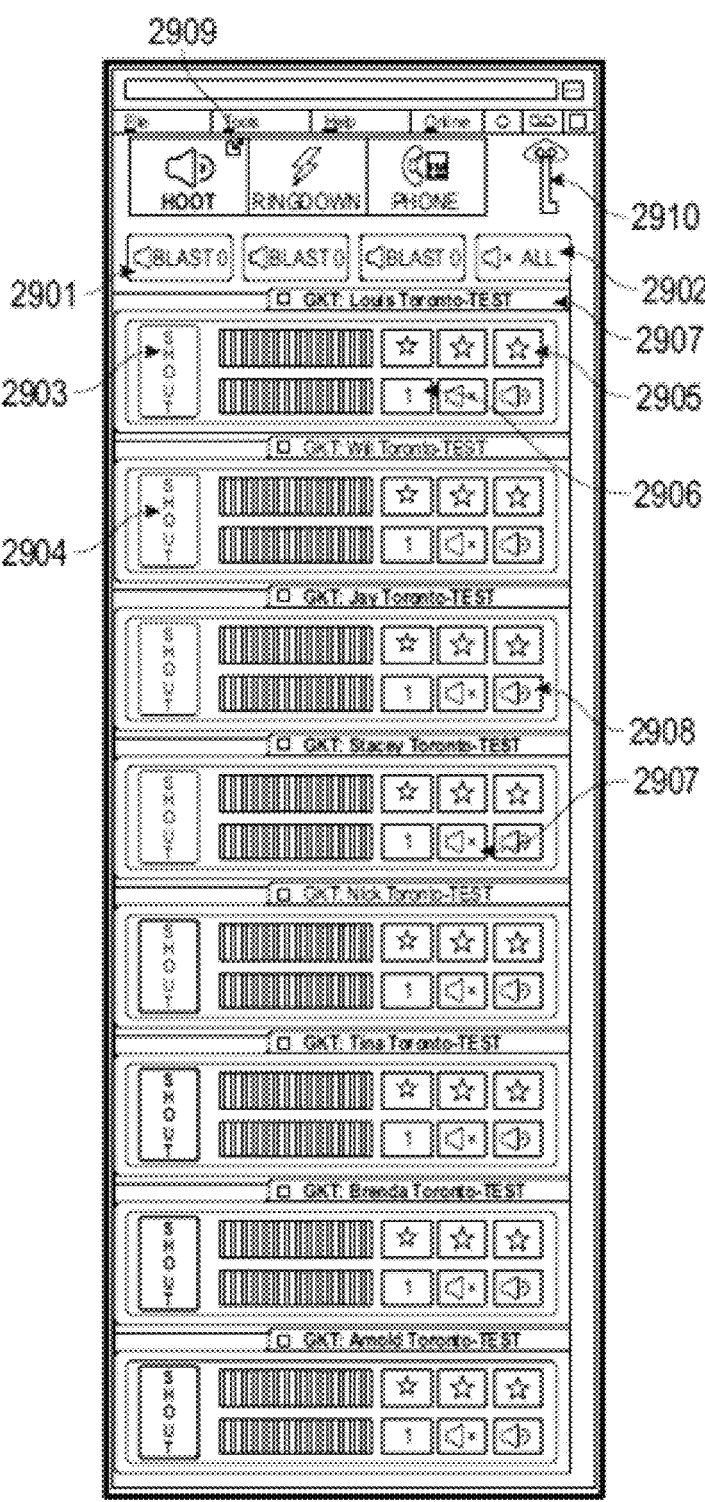

Hoot Functionality Tab (FIG. 29)

FIG. 29 shows a screenshot of an exemplary Hoot functionalities. In some embodiments, Hoots are automatically initiated and they are always connected.

Hoot Connections

In some embodiments, BLAST buttons (2901) allow the user to group their Direct Connections and SHOUT to multiple Hoot Connections that are in a like-colored Blast Group at a single time. In some embodiments, adding user can add Directs to Blast Groups. For example, the inventive client of the present invention is programmed to allow to create a group of users and add them to a single "hoot" so that each user can hear when a member of the group is shouting or the group is being shouted at. For example, an administrator—user can create a "team hoot" called DRW Natural Gas and then add any DRW employee who is on the Nat Gas team to that hoot. That team hoot would appear in the on-net directory and any broker permissioned to speak to DRW Nat Gas Team would only need to push one button to shout down to any number of DRW employees. Each DRW employee will hear the broker shouting and any employee can respond back. In some embodiments, Team Hoots can be created based on roles and/or types of users (e.g., trading team, brokerage team, etc).

In some embodiments, the button (2902) allows the user to Mute All of user's Hoots.

Hoot Connection Boxes

The eight connection boxes (e.g., 2907) below the BLAST and Mute All buttons display Hoots that the user has added.

In some embodiments, Active Hoot connections are color-coded (e.g., green border when shouting and a red border when muted).

In some embodiments, Hoots are shown below the Blast Buttons on the HOOT Tab and have a green icon next to the direct connection's name if the other user is online.

In some embodiments, Hoots are shown in an inactive (grayed out) state if the counterparty is offline.

In some embodiments, Hoots automatically re-connect in the event of a network failure.

In some embodiments, Hoots cannot be manually disconnected, to end a hoot connection the user needs to be removed from a Command Portal.

In some embodiments, Hoots can be converted to Ringdown direct connections on the Command Portal (i.e., this ends user's connection and the user will have to reconnect on the Ringdown tab).

Exemplary Hoot Connection Window Buttons

HotKey—pressing the assigned key combination will activate SHOUT functionality (2903 and 2904):

Shout active (2903)—the user's voice is heard;

Shout inactive (2904)—the user's voice is not heard;

SHOUT (2903)—clicking and holding SHOUT unmutes a microphone, releasing the button mutes your microphone.

Star Buttons (2905)—allow the user to toggle contact membership in a Blast Group. For example, the user can SHOUT to all members of a Blast Group by clicking the corresponding Blast button (e.g., the same color) at the top of the panel.

Blast Buttons (2901)—each contact can be a member of a Blast Group; numbers on the button show how many contacts belong to that group.

Mute All (2902)—allows the user to mute all connections at once if in the continuous mode.

Device Button (2906)—switches between configured audio devices.

Mute Button (2907)—mutes the audio to this connection.

Volume Button (2908)—adjust volume for user's microphone and speaker.

Figure 30:
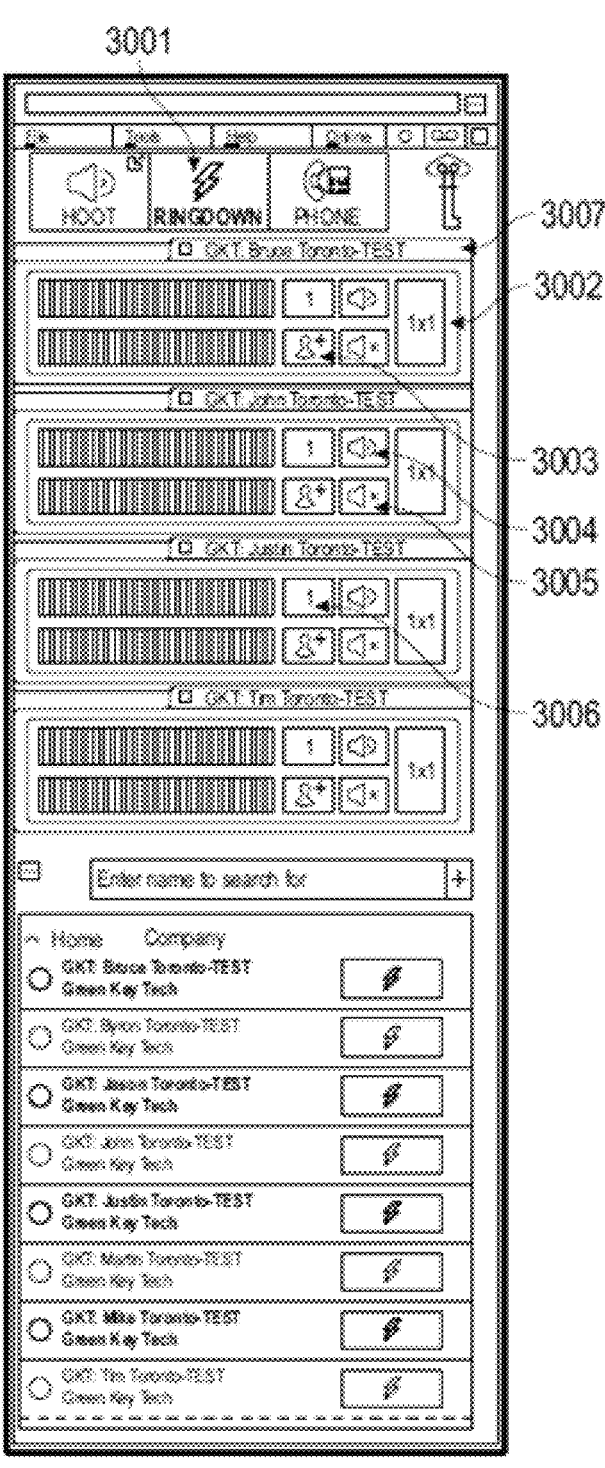

Ringdown Functionality (FIG. 30)

FIG. 30 shows a screenshot of an exemplary Ringdown Tab functionalities.

Ringdown Connections

Ringdowns are Direct Connections which are active only on-demand. In some embodiments, Ringdown connections e.g., the exemplary connection 3007) can be established by clicking on the Ringdown connect button next to contact name. For example, a Ringdown connection has statically configured endpoints and does not require dialing to connect calls. In some embodiments, the inventive soft telephone client of the present invention utilize color-coded pattern such as the Ringdown connect button (3001) turns red on connection and a connection panel (3007) appears above user list.

In some embodiments, Ringdowns can be manually disconnected by clicking the red people icon (3002) on the active connection box. When the ringdown is disconnected, the button will turn green again. In some embodiments, Ringdowns only have a green connect icon when the connection is active. Otherwise the icon is gray.

In some embodiments, Ringdowns will not automatically re-connect in the event of a network failure. The user needs to re-connect manually.

In some embodiments, Ringdowns can be converted to Hoot connection on the Command Panel (this will disconnect the connection and start automatically as Hoot as long as the counterparty agrees to modify his connection to a Hoot).

In some embodiments, Each of the Hoot connection can have a red or green connection status to indicate if the other user is online or offline.

Exemplary Ringdown Connection Window Buttons

Ringdown Connect Button (3001)—used to establish a Ringdown connection.

Disconnect Button (3002) disconnects established Ringdown connection.

Group Chat (3003)—used to establish a group call.

Volume Button (3004)—adjust volume for microphone and speaker.

Mute Button (3005)—mute the audio to this connection.

Device Button (3006) switches between configured audio devices.

Detachable Tabs

In some embodiments, the user can detach tabs from the main window to better adjust the user's workspace by clicking a detach icon (2909) on the tab. To reattach the tab, the user can click on the reattach icon or the key icon (2910).

Hoot Tab Detached

In some embodiments, for example, the Hoot tab can be programmed to detach with the number of configured hoots in packs of X numbers (e.g., 2, 3, 4, 5, 6, 7, 8, 9, 10, or more). For example, as shown in a screenshot of FIG. 20, if the user only has twelve hoots, the user sees one pack with eight and another with four.

Ringdown Tab Detached

Figure 31:
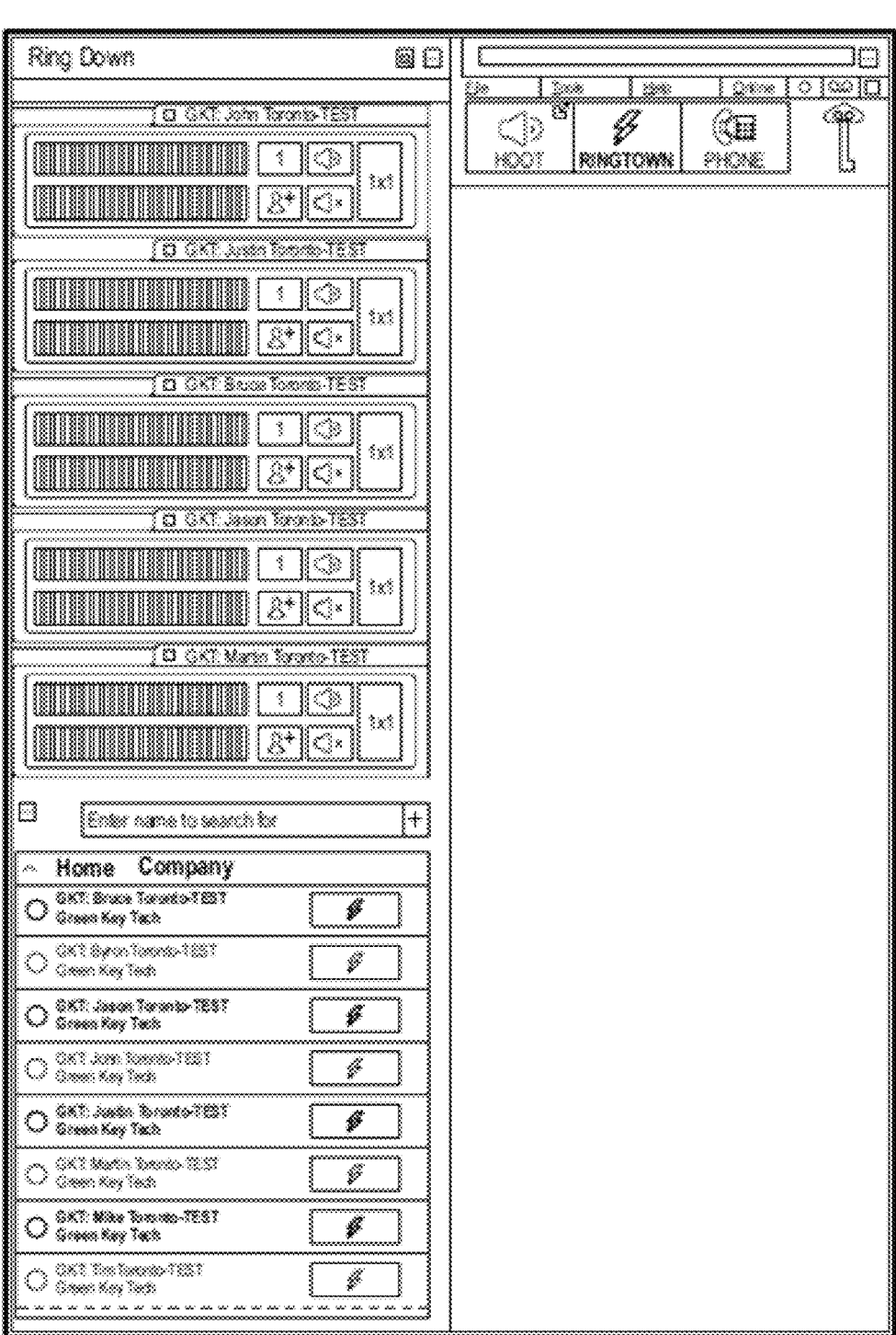

For example, a screenshot of FIG. 31 shows Ringdown tab detachment.

Phone Tab Detached

Figure 32:
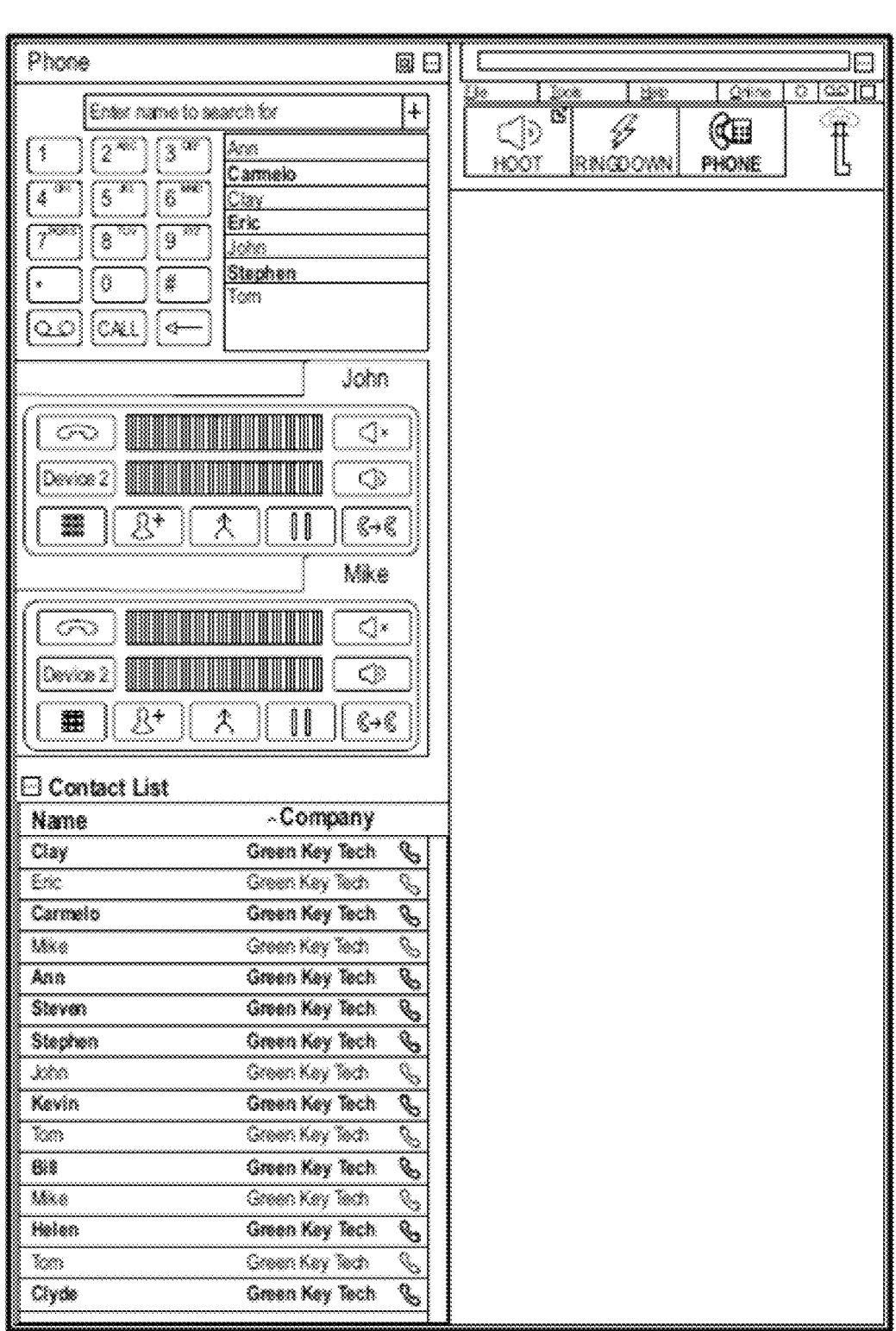

For example, a screenshot of FIG. 32 shows a Phone Tab detachment.

Toggle Between Compact Mode and Full Screen Mode

Figure 33:
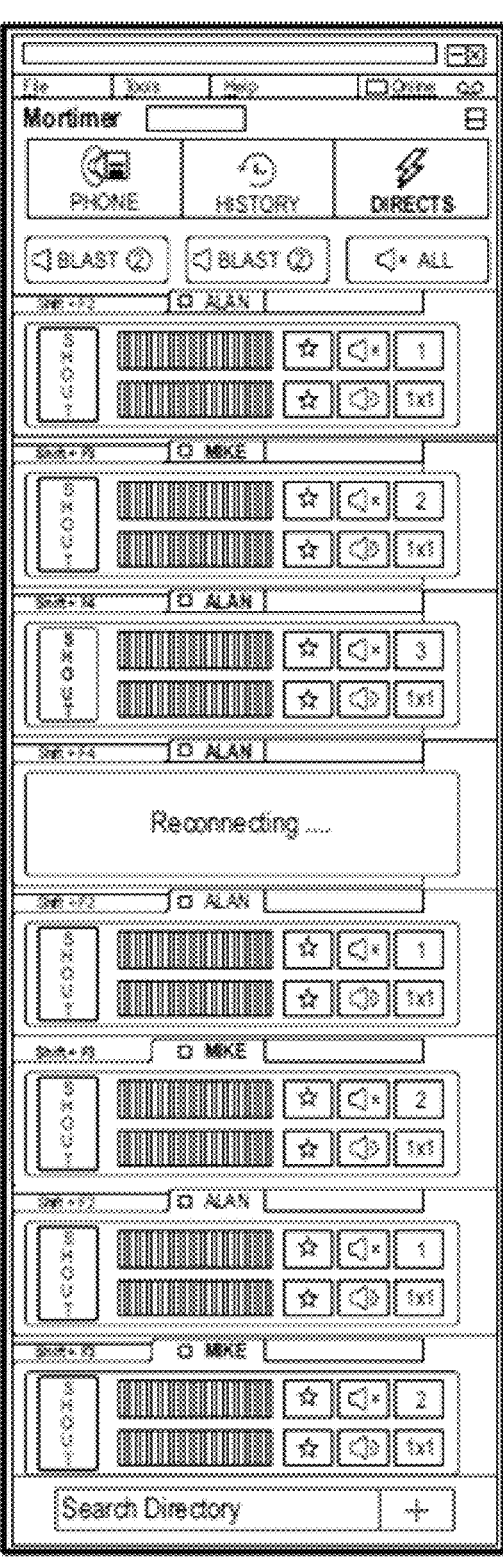

In some embodiments, the inventive soft telephone client of the present invention is programmed/configured to permit users to toggle (i.e., switch back and forth) between a compact version of the inventive client (a screenshot of FIG. 33) and the full screen mode (FIG. 22).

Further Illustrative Operating Environments

FIG. 1 illustrates one embodiment of an environment in which the present invention may operate. However, not all of these components may be required to practice the invention, and variations in the arrangement and type of the components may be made without departing from the spirit or scope of the present invention. In some embodiment, the inventive systems of the instant invention can process information for a large number of users (e.g., at least 100; at least 1000; at least 10,000; at least 10,000; at least 100,000; at least 1,000,000, etc.) and concurrent transactions/connections (e.g., at least 10,000; at least 100,000; at least 1,000, 000, etc.). In other embodiments, the system and method are based on a scalable computer and network architecture that incorporates varies strategies for assessing the data, caching, searching, and database connection pooling. An example of the scalable architecture is an architecture that is capable of operating multiple servers.

In embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, programming may include either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable then to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISBNs), Digital Subscriber Lines (DSLs), wireless links including satellite links, or other communications links known to those skilled in the art. Furthermore, in some embodiments, remote computers and other related electronic de ices could be remotely connected to either LANs or WANs via a modem and temporary telephone link In essence, in some embodiments, network 105 includes any communication method by which information may travel between client devices 102-104, and servers 106 and 107.

Figure 2:
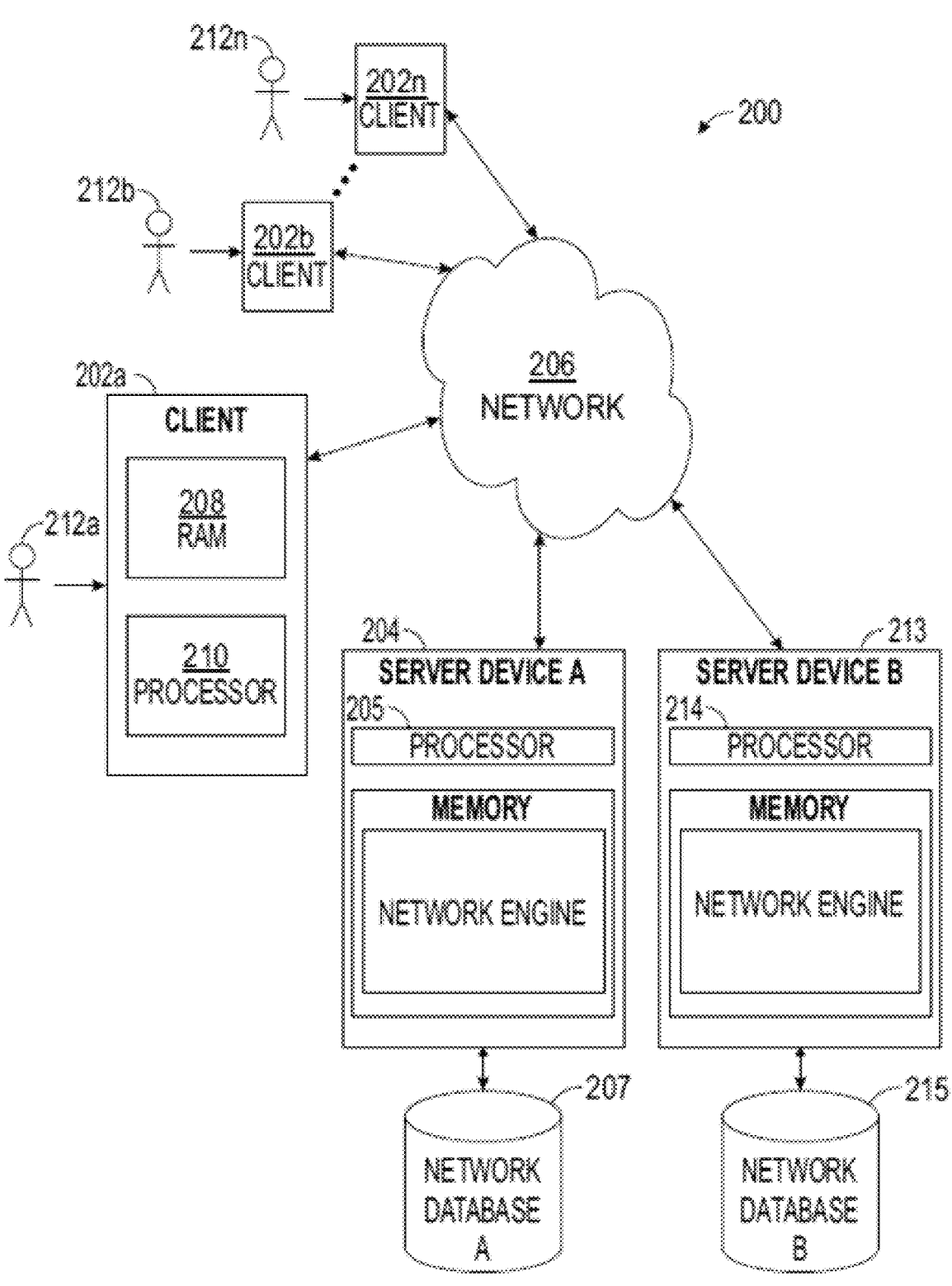

FIG. 2 shows another exemplary embodiment of the computer and network architecture that supports the method and system. The member devices 202a, 202b thru 202n shown each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202*a-n* shown may include, for example, personal computers executing a browser application program such as Microsoft Corporation's Internet Explorer™, Apple Computer, Inc.'s Safari™, Mozilla Firefox, and Opera. Through the client devices 202*a-n*, users, 212*a-n* communicate over the network 206 with each other and with other systems and devices coupled to the network 206. As shown in FIG. 1B, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

For purposes of the instant description, the terms "cloud," "Internet cloud," "cloud computing," "cloud architecture,"

Figure 16:
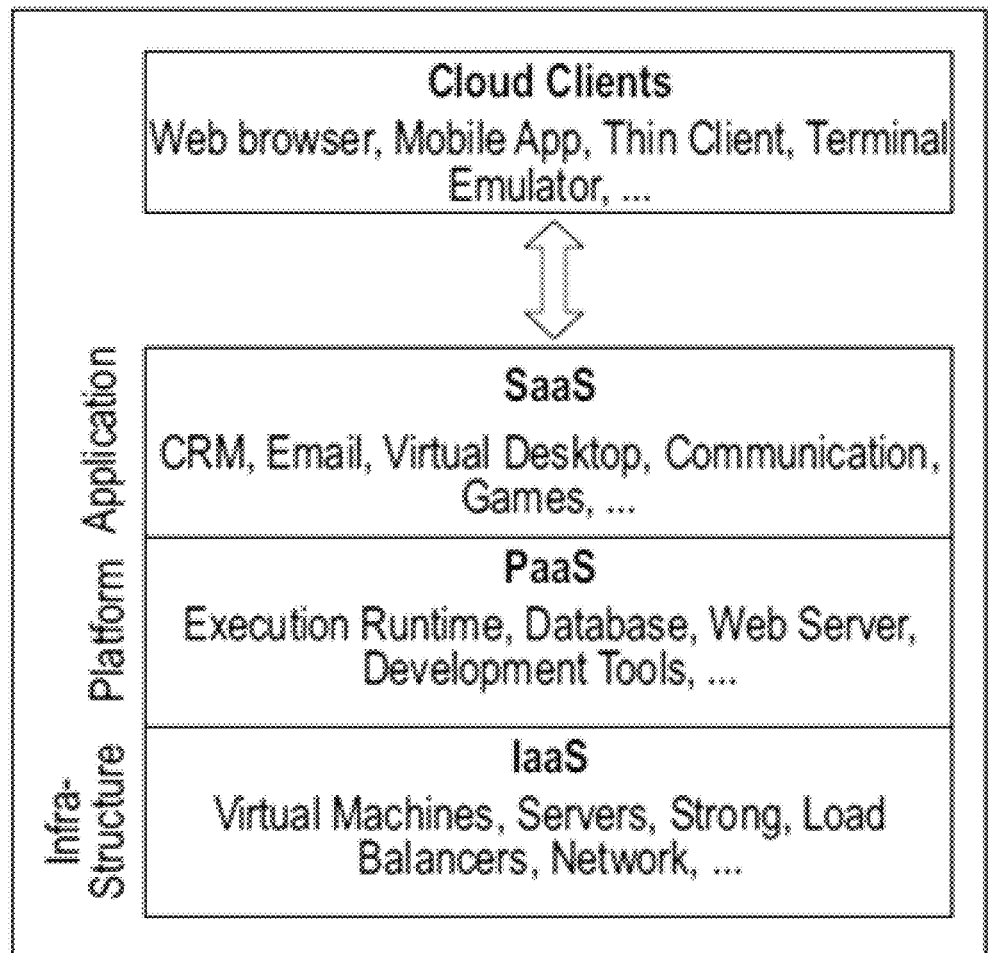
Figure 17:
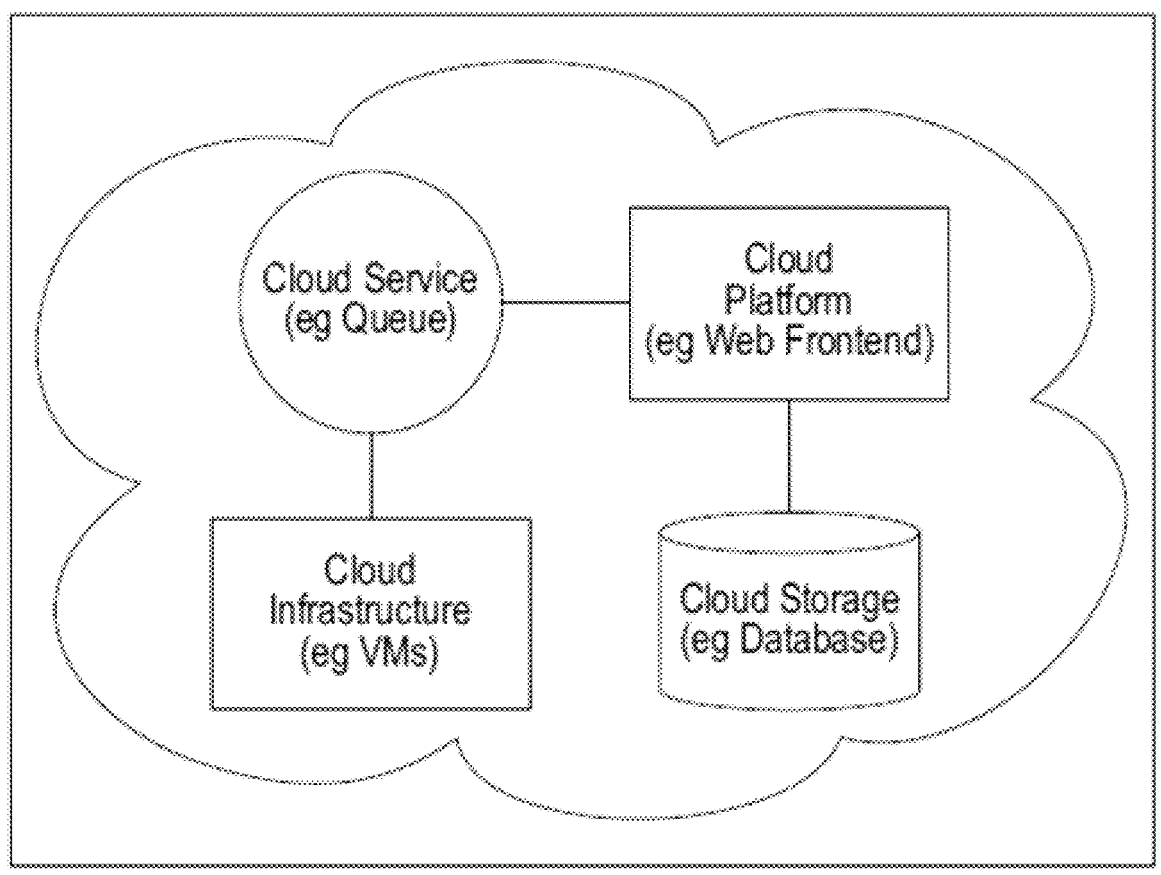

24 and similar terms correspond to at least one of the following: (1) a large number of computers connected through a real-tune communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 16 and 17 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the instant invention provides for a computer-implemented method, including: causing, by a specifically programmed computer call management communication system, to transform, over a computer network, a plurality of computing devices of a plurality of users, into a corresponding plurality of specialized call management devices, by having each computing device to execute a specialized call management client software application being in electronic communication with the specifically programmed computer call management communication system over the computer network by utilizing at least a session initiation protocol (SIP); where the specialized call management client software application, upon the execution, generates a plurality of specialized graphical user interfaces configured to allow each user of the plurality of users to concurrently initiate and maintain, over the computer network, a plurality of voice communications of distinct types with other users based, at least in part, on: maintaining each voice communication independent from another voice communication; generating an individual visual control panel for each voice communication of the plurality of voice communications, where the individual visual control panel comprises: a plurality of visual audio device control icons which are respectfully programmed, upon selection, to: i) independently and dynamically divert, in real-time, any voice communication of any type to any audio device associated with a corresponding specialized call management device of such user; ii) independently manage, in real time, each voice communication by at least: 1) putting such voice communication on hold, 2) muting such voice communication, 3) unmuting such voice communication, 4) joining a particular voice communication with at least one other voice communication, 5) disjoining the particular voice communication from the at least one other voice communication, 6) allowing independent interaction by each user with the particular voice communication, and 7) enabling each user to select for each voice communication a particular communication mode, where the particular communication mode is one of a) a push-to-talk mode and b) a continuous talk mode; where the individual visual control panel for each voice communication is configured to be detachable from a parent window of the specialized call management client software application so that each user can move the individual visual control panel to any location on a screen of a respective specialized call management device; and where the plurality of voice communications comprise voice communications of at least one of the following connection types: i) a dialed phone connection, ii) a Hoot connection, and Ringdown connection.

In some embodiments, the exemplary computer-implemented method of the present invention further includes: encrypting, by the specialized call management client software application, each voice communication of the plurality of voice communications.

In some embodiments, the exemplary computer-implemented method of the present invention further includes: tracking, in real-time, by the specifically programmed computer call management communication system, the plurality of voice communications to generate call history and use statistics on real-time basis; and causing to display, by the specifically programmed computer call management communication system, at least one automatically updatable visual dashboard configured to present the call history and the use statistics to an administrator user.

In some embodiments, the exemplary computer-implemented method of the present invention further includes: transcribing, in real-time, by the specialized call management client software application, each voice communication.

In some embodiments, the exemplary computer-implemented method of the present invention further includes: data mining, in real-time, by the specifically programmed computer call management communication system, the transcribed voice communications based on at least one predetermined parameter.

In some embodiments, the plurality of users are securities trading professionals and where the at least one pre-determined parameter is associated with at least one trading compliance requirement.

In some embodiments, the exemplary computer-implemented method of the present invention further includes: outputting, in real-time, by the specialized call management client software application, the transcribed voice communications of a particular time length into a chat box. In some embodiments, the particular time length is between 5 and 30 seconds.

In some embodiments, the exemplary specialized call management client software application is further programmed to: enable, each user, to create, in real-time, a group of users utilizing a plurality of Hoot connections; and broadcast, in real-time, at least one voice communication to the group of users utilizing the plurality of Hoot connections.

In some embodiments, the exemplary specialized call management client software application is further programmed to enable each user to switch between a minimized display of the plurality of specialized graphical user interfaces and a full-screen display of the plurality of specialized graphical user interfaces; where the minimized display occupies a portion of a screen of each respective specialized call management device of a particular user; and where the full-screen display occupies the entire screen of such respective specialized call management device of the particular user.

In some embodiments, the instant invention provides for a specifically programmed computer call management communication system, having at least the following modules: at least one specialized server specifically programmed with specialized call management software application stored on a non-transient computer readable medium, where the specialized server, upon execution of the specialized call management software application is configured to at least perform: causing to transform, over a computer network, a plurality of computing devices of a plurality of users, into a corresponding plurality of specialized call management devices, by having each computing device to execute a specialized call management client software application being in electronic communication with the specifically programmed computer call management communication system over the computer network by utilizing at least a session initiation protocol (SIP); where the specialized call management client software application, upon the execution, generates a plurality of specialized graphical user interfaces configured to allow each user of the plurality of users to concurrently initiate and maintain, over the computer network, a plurality of voice communications of distinct types with other users based, at least in part, on: maintaining each voice communication independent from another voice communication; generating an individual visual control panel for each voice communication of the plurality of voice communications, where the individual visual control panel comprises: a plurality of visual audio device control icons which are respectfully programmed, upon selection, to: i) independently and dynamically divert, in real-time, any voice communication of any type to any audio device associated with a corresponding specialized call management device of such user; ii) independently manage, in real time, each voice communication by at least: 1) putting such voice communication on hold, 2) muting such voice communication, 3) unmuting such voice communication, 4) joining a particular voice communication with at least one other voice communication, 5) disjoining the particular voice communication from the at least one other voice communication, 6) allowing independent interaction by each user with the particular voice communication, and 7) enabling each user to select for each voice communication a particular communication mode, where the particular communication mode is one of a) a push-to-talk mode and b) a continuous talk mode; where the individual visual control panel for each voice communication is configured to be detachable from a parent window of the specialized call management client software application so that each user can move the individual visual control panel to any location on a screen of a respective specialized call management device; and where the plurality of voice communications comprise voice communications of at least one of the following connection types: i) a dialed phone connection, ii) a Hoot connection, and iii) a Ringdown connection.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:
1. A system comprising:
a first computing device, a second computing device, and a third computing device; and
a server operable to establish a virtual private network (VPN) and to establish Voice Over Internet Protocol (VOIP) communications between the first computing device, the second computing device, and the third computing device over the VPN via a Session Initiation Protocol (SIP);

wherein the first computing device is operable to maintain concurrent VOIP communications via the SIP with the second computing device and the third computing device, to receive packetized audio from the second computing device and from the third computing device via the VOIP communications, and to transcribe automatically the audio in real-time;

wherein the first computing device is operable to mute either the second computing device or the third computing device, and to continue automatically transcribing speech from a user of the second computing device or the third computing device that was not muted.

2. The system of claim 1 wherein the second computing device and the third computing device are operable to receive packetized audio from the first computing device via the VOIP communications, and to automatically transcribe the audio from the first computing device in real-time.

3. The system of claim 2 wherein the first computing device, the second computing device, and the third computing device are each operable to transfer transcriptions of the audio to the server for storage.

4. The system of claim 3 wherein the first computing device is further operable to identify a keyword in the transcribed audio, and to generate an alert based on the keyword identified.

5. The system of claim 4 wherein the first computing device is further operable to push-to-talk connect to either the second computing device or the third computing device via a user prompt.

6. The system of claim 2 wherein the first computing device is further operable to identify a keyword in the transcribed audio, and to generate an alert based on the keyword identified.

7. The system of claim 6 wherein the first computing device is further operable to push-to-talk connect to either the second computing device or the third computing device via a user prompt.

8. The system of claim 2 wherein the first computing device is further operable to push-to-talk connect to either the second computing device or the third computing device via a user prompt.

9. The system of claim 1 wherein the first computing device, the second computing device, and the third computing device are each operable to transfer transcriptions of the audio to the server for storage.

10. The system of claim 9 wherein the first computing device is further operable to identify a keyword in the transcribed audio, and to generate an alert based on the keyword identified.

11. The system of claim 10 wherein the first computing device is further operable to push-to-talk connect to either the second computing device or the third computing device via a user prompt.

12. The system of claim 9 wherein the first computing device is further operable to push-to-talk connect to either the second computing device or the third computing device via a user prompt.

13. The system of claim 1 wherein the first computing device is further operable to identify a keyword in the transcribed audio, and to generate an alert based on the keyword identified.

14. The system of claim 13 wherein the first computing device is further operable to push-to-talk connect to either the second computing device or the third computing device via a user prompt.

15. The system of claim 1 wherein the first computing device is further operable to push-to-talk connect to either the second computing device or the third computing device via a user prompt.

* * * * *